United States Patent
Tiramani

(10) Patent No.: US 10,661,835 B2
(45) Date of Patent: May 26, 2020

(54) VEHICLE SYSTEM

(71) Applicant: Paolo M. B. Tiramani, Greenwich, CT (US)

(72) Inventor: Paolo M. B. Tiramani, Greenwich, CT (US)

(73) Assignee: 500 Group, Inc., Las Vegas, NV (US)

( * ) Notice: Subject to any disclaimer, the term of this patent is extended or adjusted under 35 U.S.C. 154(b) by 27 days.

(21) Appl. No.: 14/601,348

(22) Filed: Jan. 21, 2015

(65) Prior Publication Data
US 2015/0210319 A1 Jul. 30, 2015

Related U.S. Application Data

(60) Provisional application No. 61/931,507, filed on Jan. 24, 2014.

(51) Int. Cl.
B62D 21/18 (2006.01)
B62D 23/00 (2006.01)
B60G 17/027 (2006.01)
B62D 35/00 (2006.01)

(52) U.S. Cl.
CPC ....... B62D 21/183 (2013.01); B60G 17/0272 (2013.01); B62D 23/005 (2013.01); B62D 35/00 (2013.01); B60G 2202/12 (2013.01); B60G 2202/42 (2013.01); B60G 2204/124 (2013.01); B60G 2204/419 (2013.01); B60G 2300/27 (2013.01); B60G 2500/30 (2013.01)

(58) Field of Classification Search
CPC ........ B62D 21/02; B62D 21/07; B62D 39/00; B62D 21/17; B62D 21/06; B62D 23/005; B62D 21/183; B62D 35/00; B60G 2204/12; B60G 2204/128; B60G 2204/129; B60G 2204/44; B60G 2500/30; B60G 2204/61; F16F 9/56; F16F 1/121
See application file for complete search history.

(56) References Cited

U.S. PATENT DOCUMENTS

| 2,108,215 | A | * | 2/1938 | Stief | B62D 23/005 296/203.01 |
|---|---|---|---|---|---|
| 2,177,896 | A | * | 10/1939 | Lee | B62D 23/005 296/205 |
| 2,344,378 | A | * | 3/1944 | Wagner | B62D 21/02 280/796 |
| 3,022,846 | A | | 2/1962 | Thompson | |
| 3,149,856 | A | * | 9/1964 | Schilberg | B60G 99/002 180/89.2 |
| 3,575,454 | A | * | 4/1971 | Meeker | B60F 1/005 104/118 |
| 3,971,588 | A | * | 7/1976 | Bauer | B62D 23/005 280/784 |
| 4,217,970 | A | * | 8/1980 | Chika | B60G 21/055 180/298 |
| 4,426,101 | A | * | 1/1984 | Dyer | B60G 9/00 280/124.109 |
| 4,533,172 | A | | 8/1985 | Oliver | |

(Continued)

Primary Examiner — Paul N Dickson
Assistant Examiner — Timothy Wilhelm
(74) Attorney, Agent, or Firm — McCarter & English, LLP

(57) ABSTRACT

A vehicle system is provided. The vehicle system includes a vehicle chassis with a plurality of elongated tubular members. The tubular members are structured to be configured in a configuration selected from the group consisting of a coup, a convertible, a truck, a transport vehicle, or a bus.

2 Claims, 24 Drawing Sheets

(56) References Cited

U.S. PATENT DOCUMENTS

| | | | | |
|---|---|---|---|---|
| 4,744,444 A * | 5/1988 | Gillingham | | F16F 9/44 137/523 |
| 4,950,026 A * | 8/1990 | Emmons | | B62D 21/06 296/203.01 |
| 5,259,661 A * | 11/1993 | Thum | | B62D 21/08 296/203.01 |
| 5,338,080 A * | 8/1994 | Janotik | | B62D 23/005 280/785 |
| 5,564,745 A * | 10/1996 | Morin, Jr. | | B62D 39/00 280/784 |
| 5,577,571 A * | 11/1996 | Rizzoli | | B60G 3/20 180/291 |
| 5,645,312 A * | 7/1997 | Enning | | B62D 23/005 296/198 |
| 5,794,398 A * | 8/1998 | Kaehler | | B21C 37/29 29/421.1 |
| 5,954,364 A * | 9/1999 | Nechushtan | | B60R 21/13 280/781 |
| 6,022,070 A * | 2/2000 | Ashina | | B62D 23/005 296/205 |
| 6,517,111 B2 * | 2/2003 | Mizuta | | B62D 23/005 180/311 |
| 6,892,496 B1 * | 5/2005 | Youngs | | B60J 5/0416 49/502 |
| 7,162,928 B2 * | 1/2007 | Shank | | E05F 15/46 73/780 |
| 7,350,628 B2 * | 4/2008 | Adoline | | F16F 3/04 188/67 |
| 7,377,522 B2 * | 5/2008 | MacIsaac | | B60G 3/01 280/5.506 |
| 7,402,971 B2 * | 7/2008 | Averitt | | E05F 15/40 318/266 |
| 7,461,864 B2 * | 12/2008 | Ervin | | B62D 21/08 180/298 |
| 7,464,980 B2 * | 12/2008 | Gutendorf | | B60J 7/0573 296/107.01 |
| 7,537,499 B2 * | 5/2009 | Davis | | B60G 3/06 114/360 |
| 7,641,236 B2 * | 1/2010 | Yasuhara | | B62D 21/06 280/781 |
| 7,648,170 B2 * | 1/2010 | Geslin | | B60G 7/02 280/785 |
| 8,083,242 B2 * | 12/2011 | Brazier | | B60G 21/04 180/9.1 |
| 8,113,530 B2 * | 2/2012 | Pierick | | B62K 3/04 280/281.1 |
| 8,240,748 B2 * | 8/2012 | Chapman | | A61G 3/00 296/187.07 |
| 8,376,441 B2 * | 2/2013 | Nakamura | | B62D 21/186 296/183.1 |
| 8,499,882 B2 * | 8/2013 | Tsumiyama | | B60N 2/012 180/311 |
| 8,714,632 B2 * | 5/2014 | Chapman | | A61G 3/00 296/187.07 |
| 8,944,492 B2 * | 2/2015 | Hufnagl | | B62D 21/183 296/190.01 |
| 8,967,601 B2 * | 3/2015 | Ozaki | | F16F 9/54 267/221 |
| 8,979,123 B1 * | 3/2015 | Takahashi | | B62D 23/005 280/748 |
| 8,997,908 B2 * | 4/2015 | Kinsman | | B62D 21/183 180/89.1 |
| 9,016,774 B2 * | 4/2015 | Murray | | B62D 23/005 296/205 |
| 9,056,637 B2 * | 6/2015 | Takata | | B62D 23/005 |
| 9,102,205 B2 * | 8/2015 | Kvien | | B60G 3/20 |
| 9,187,128 B2 * | 11/2015 | Koberstein | | B62K 5/01 |
| 9,216,777 B2 * | 12/2015 | Nakamura | | B62D 21/186 |
| 2003/0057737 A1 * | 3/2003 | Bock | | B62D 29/002 296/187.12 |
| 2005/0247505 A1 * | 11/2005 | Nagle | | B62D 23/005 180/312 |
| 2006/0186699 A1 * | 8/2006 | Davis | | B60G 3/06 296/187.01 |
| 2006/0273539 A1 * | 12/2006 | Barth | | B60G 21/0558 280/124.107 |
| 2007/0221430 A1 * | 9/2007 | Allison, Sr. | | B60F 3/0038 180/299 |
| 2007/0295784 A1 * | 12/2007 | Chen | | B23K 20/12 228/112.1 |
| 2009/0014993 A1 * | 1/2009 | Tope | | B60R 3/002 280/781 |
| 2011/0089658 A1 * | 4/2011 | Buhl | | B60G 17/0277 280/124.106 |
| 2012/0181781 A1 * | 7/2012 | Gaussin | | B62D 21/12 280/800 |
| 2013/0033070 A1 * | 2/2013 | Kinsman | | B62D 21/183 296/190.03 |
| 2014/0103627 A1 * | 4/2014 | Deckard | | F16B 7/18 280/807 |
| 2014/0225358 A1 * | 8/2014 | Shinbori | | B60N 3/026 280/779 |
| 2014/0265285 A1 * | 9/2014 | Erspamer | | B60N 2/6009 280/783 |
| 2014/0365079 A1 * | 12/2014 | Kaiser | | B60R 21/013 701/45 |

* cited by examiner

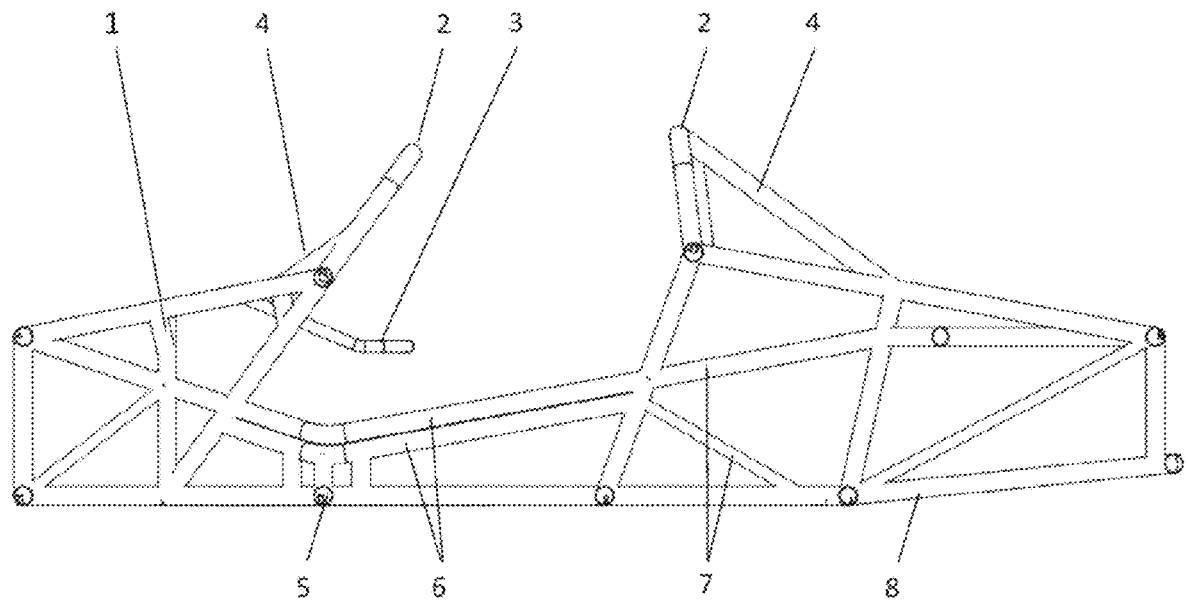
FIG 1 / CORE OR ROADSTER CHASSIS / SIDE
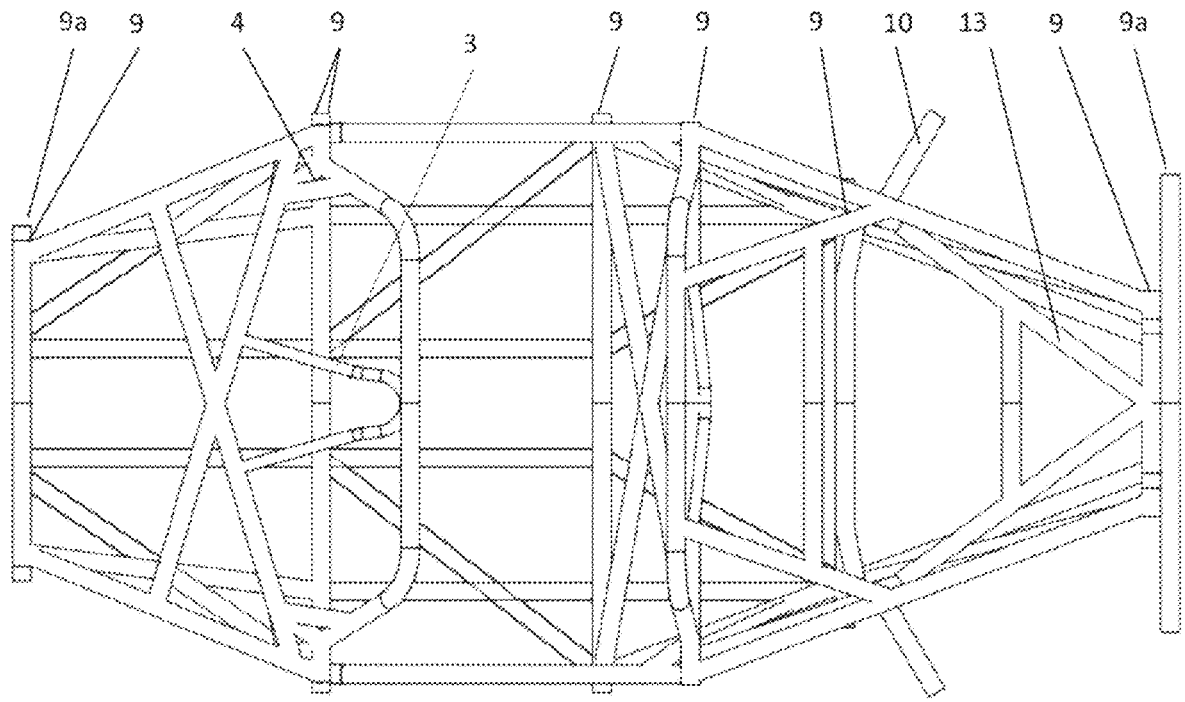
FIG 2 / CORE OR ROADSTER CHASSIS / TOP

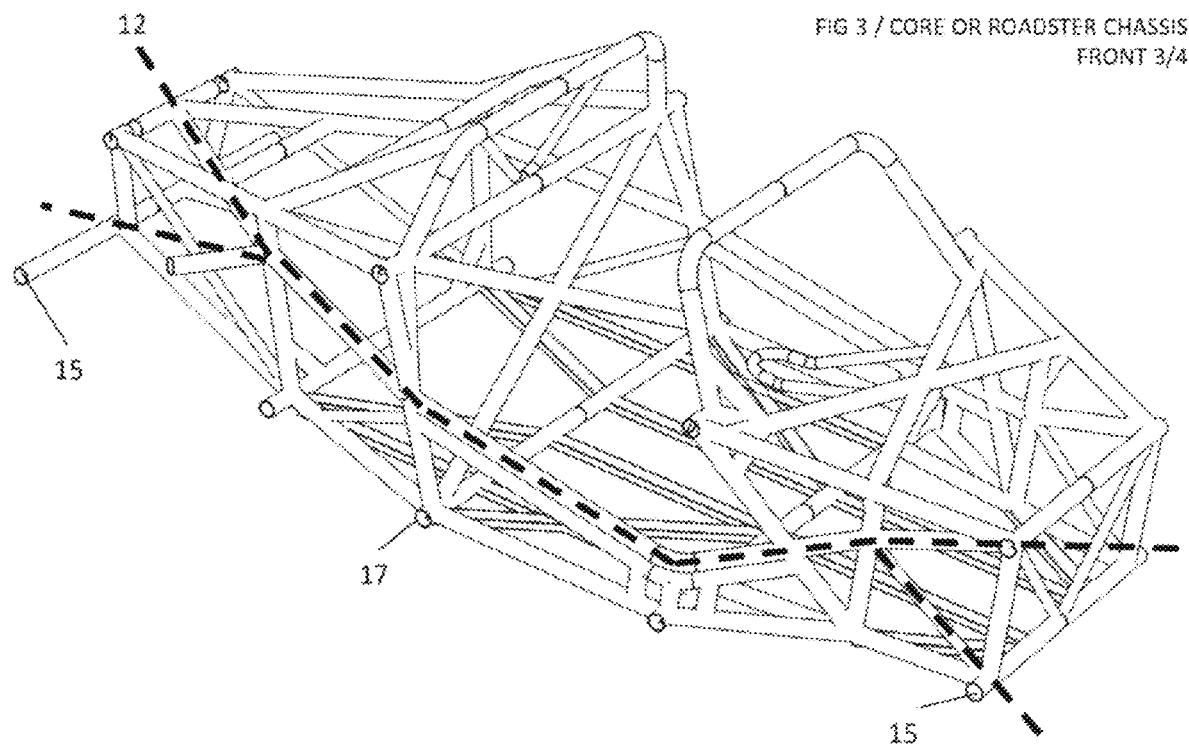
FIG 3 / CORE OR ROADSTER CHASSIS
FRONT 3/4
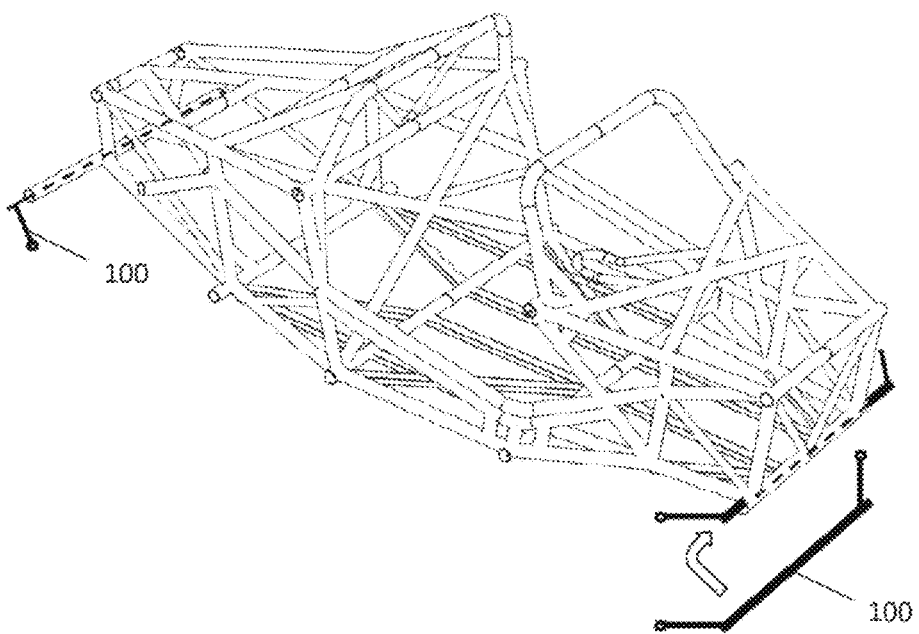
FIG 3A / CORE OR ROADSTER CHASSIS

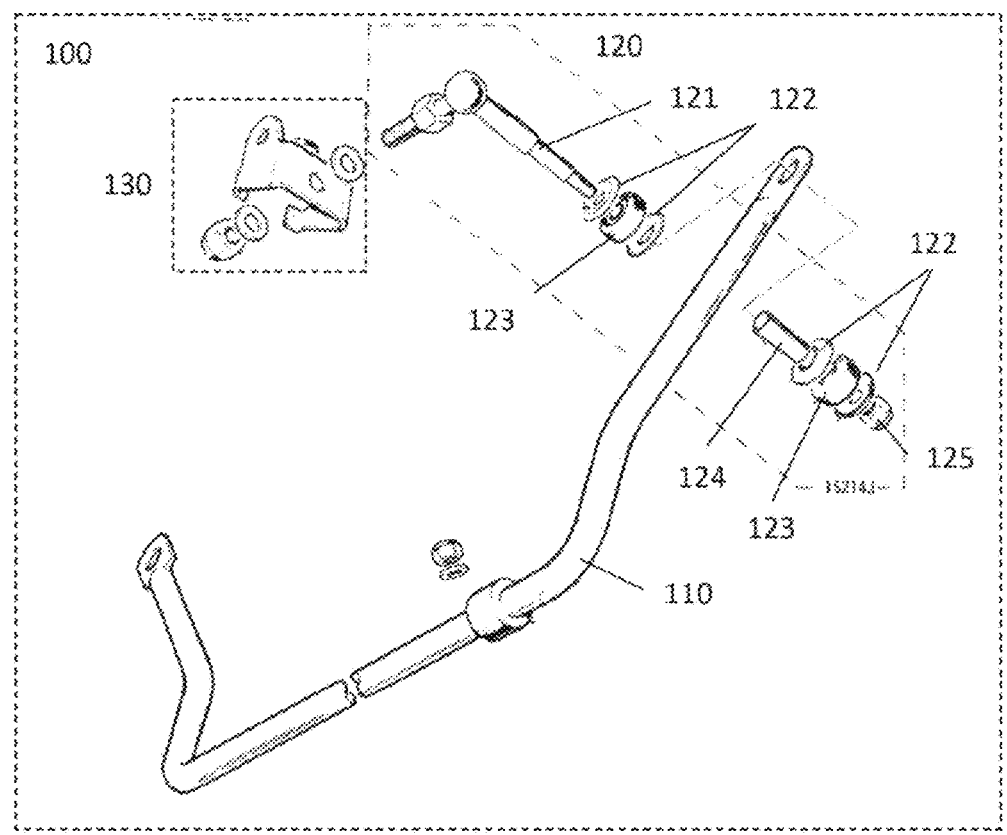
FIG 3B / ANTI-ROLL BAR 100
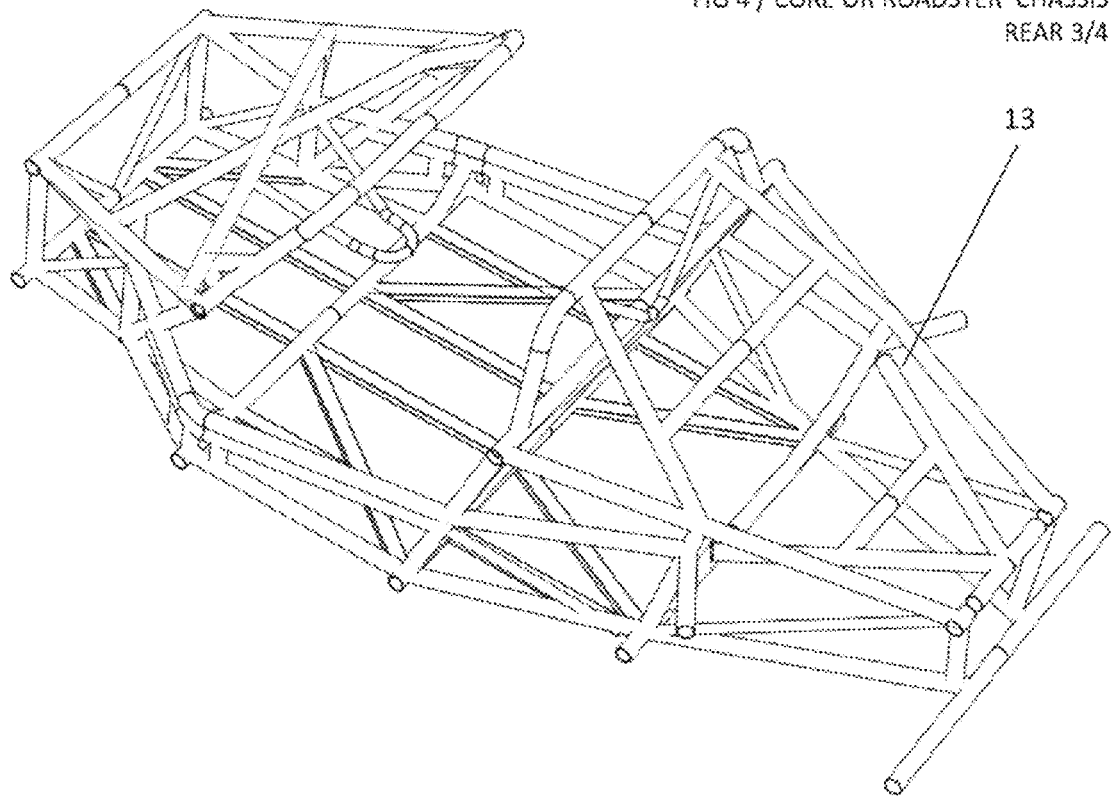
FIG 4 / CORE OR ROADSTER CHASSIS REAR 3/4

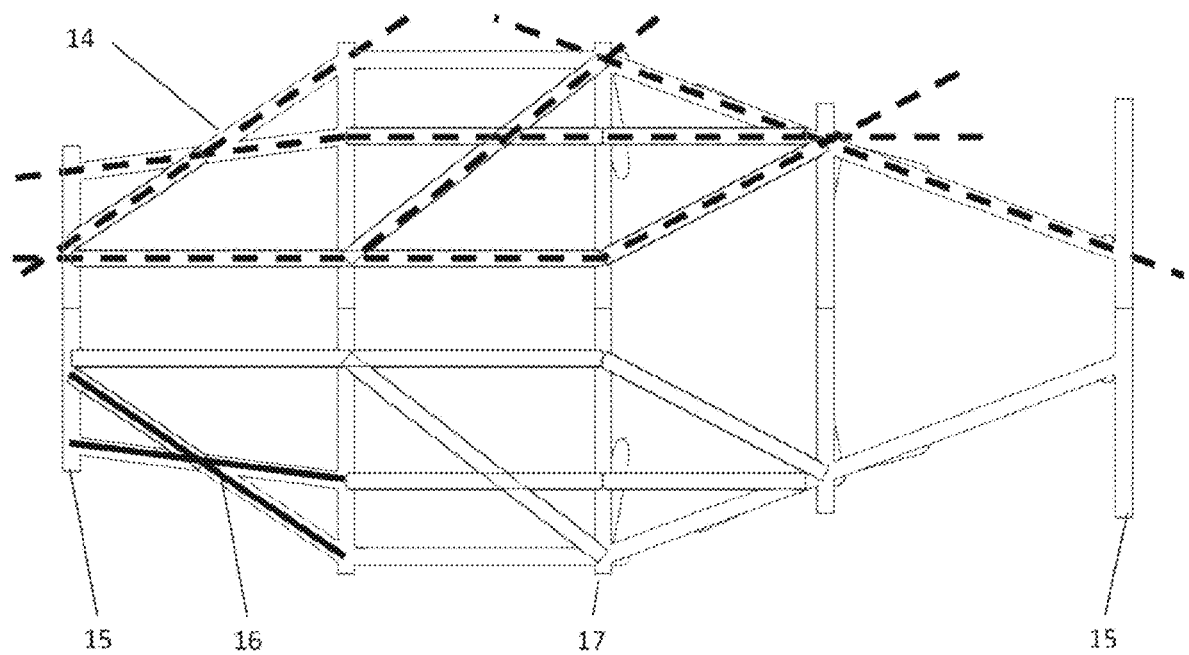
FIG 5 / HERRINGBONE FLOOR
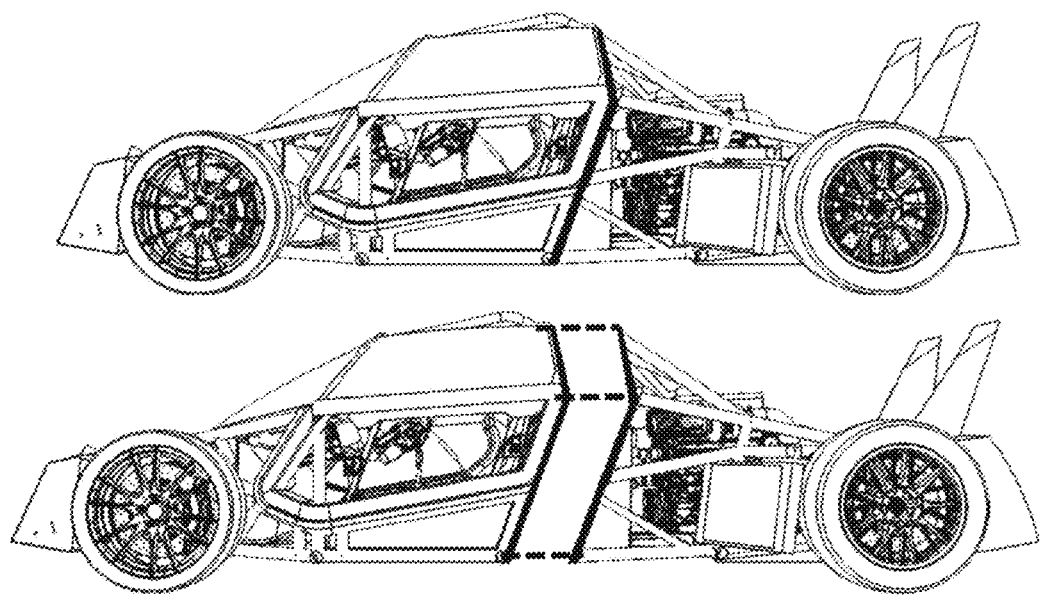
FIG 5A / PARTING LINE 2-4 SEATER

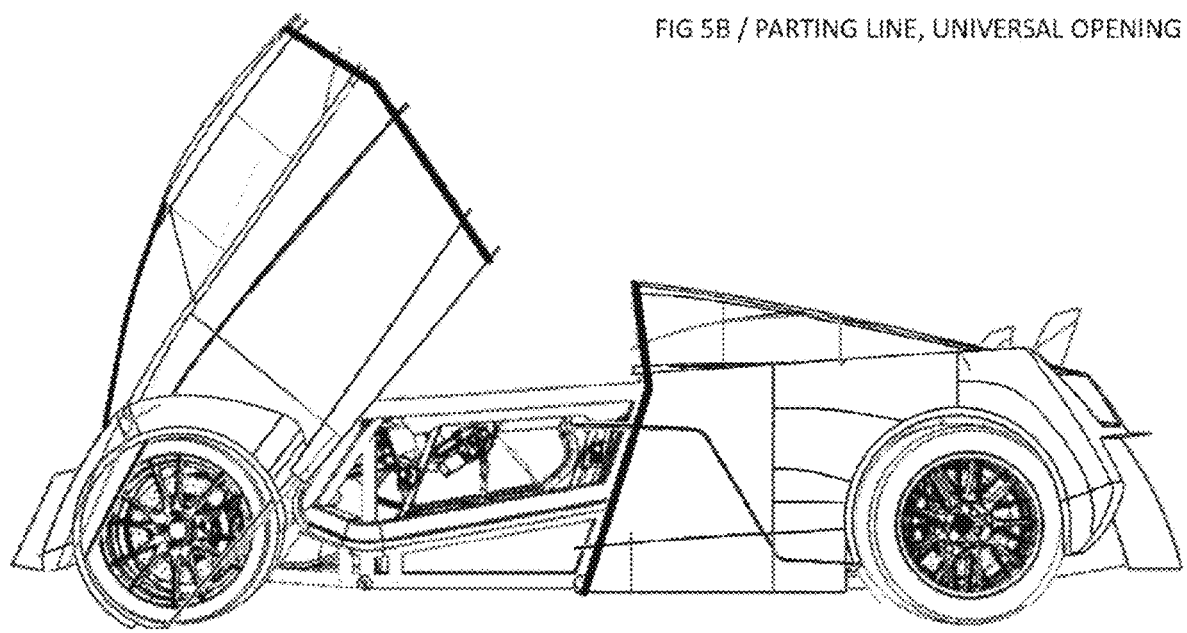
FIG 5B / PARTING LINE, UNIVERSAL OPENING
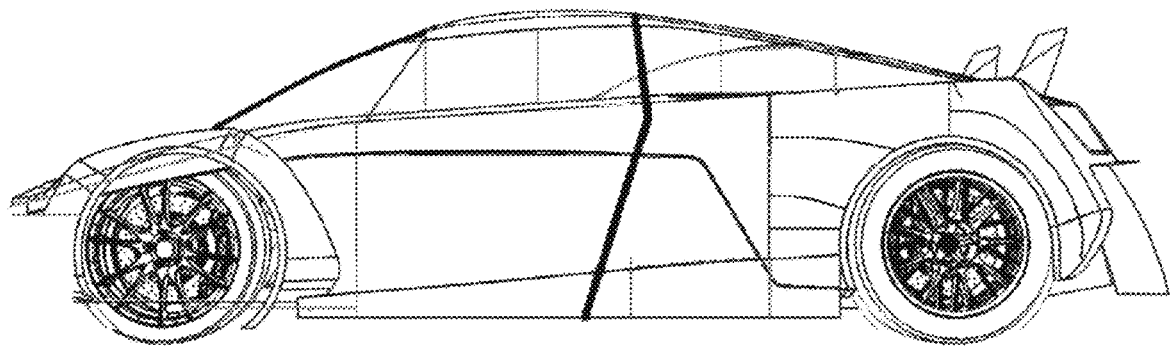

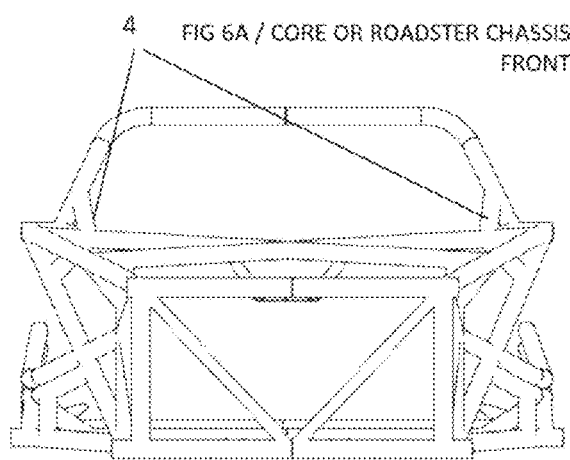
FIG 6A / CORE OR ROADSTER CHASSIS FRONT
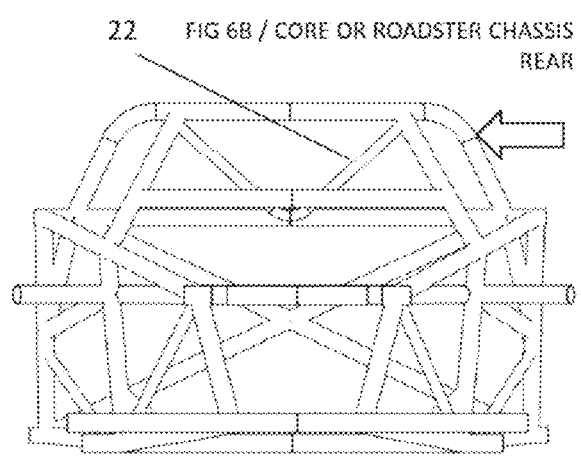
FIG 6B / CORE OR ROADSTER CHASSIS REAR

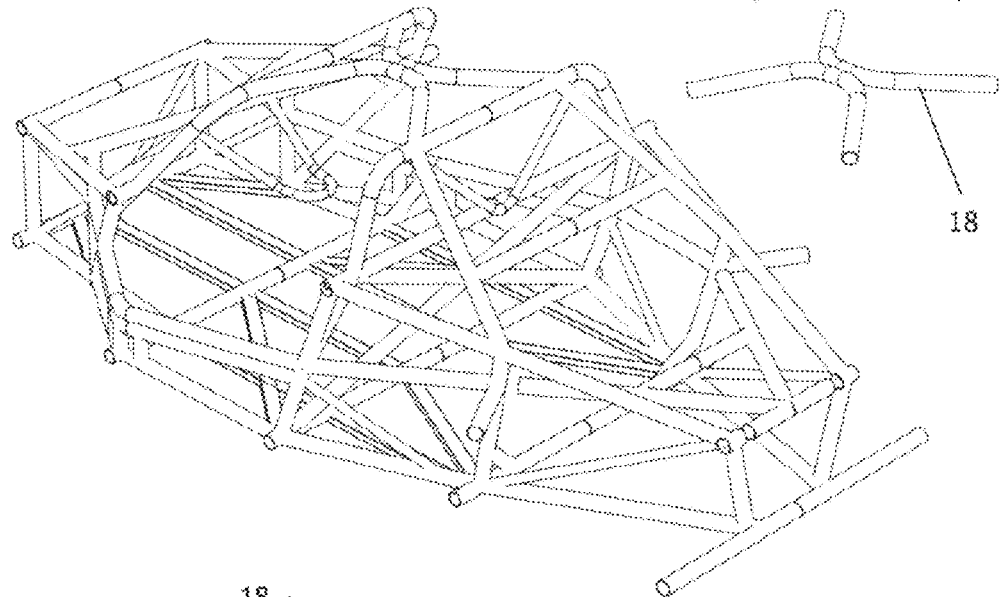
FIG 7 / COUPE BRACKET / REAR 3/4
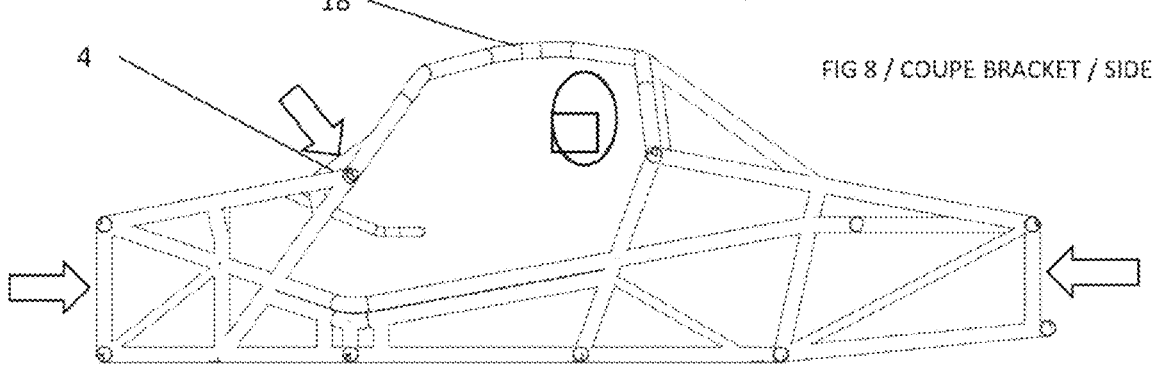
FIG 8 / COUPE BRACKET / SIDE
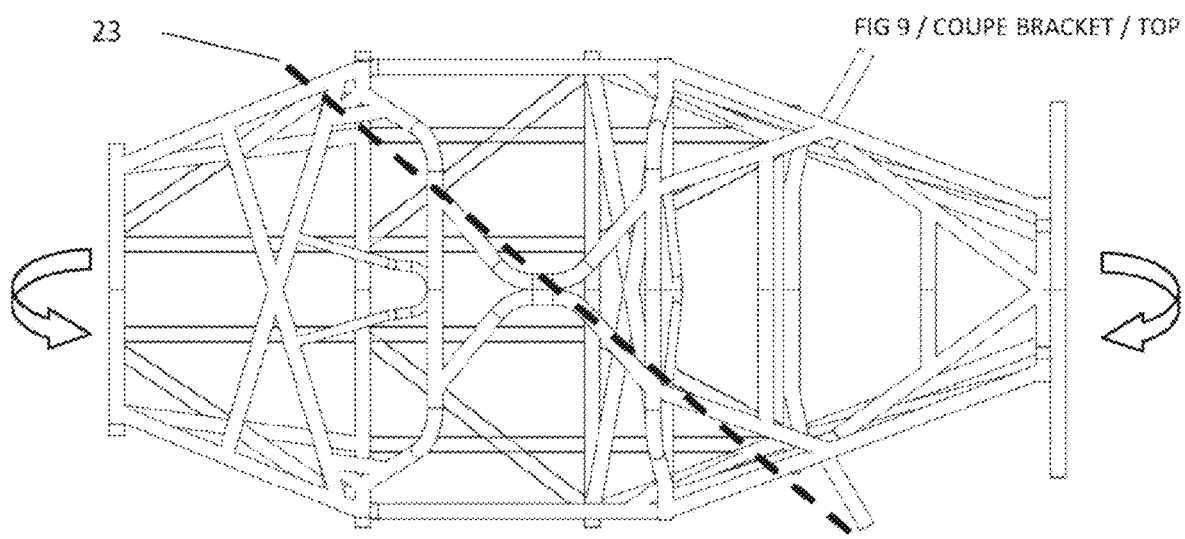
FIG 9 / COUPE BRACKET / TOP

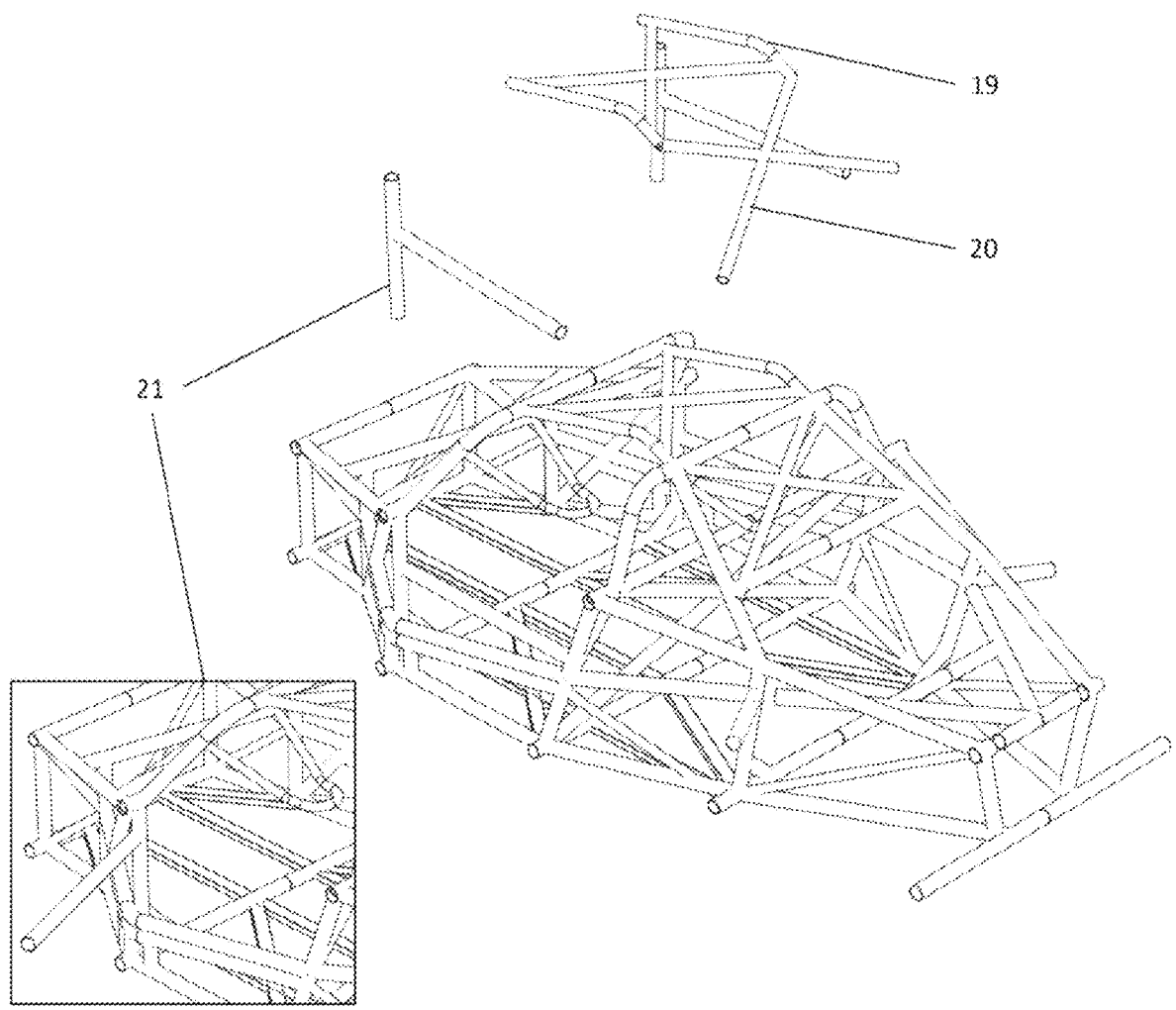
FIG 10 / TRACK BRACKETS / REAR 3/4
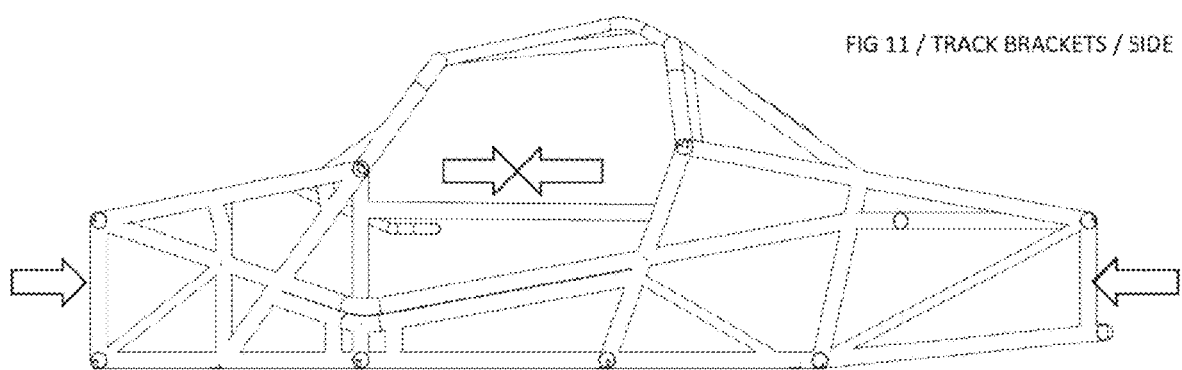
FIG 11 / TRACK BRACKETS / SIDE

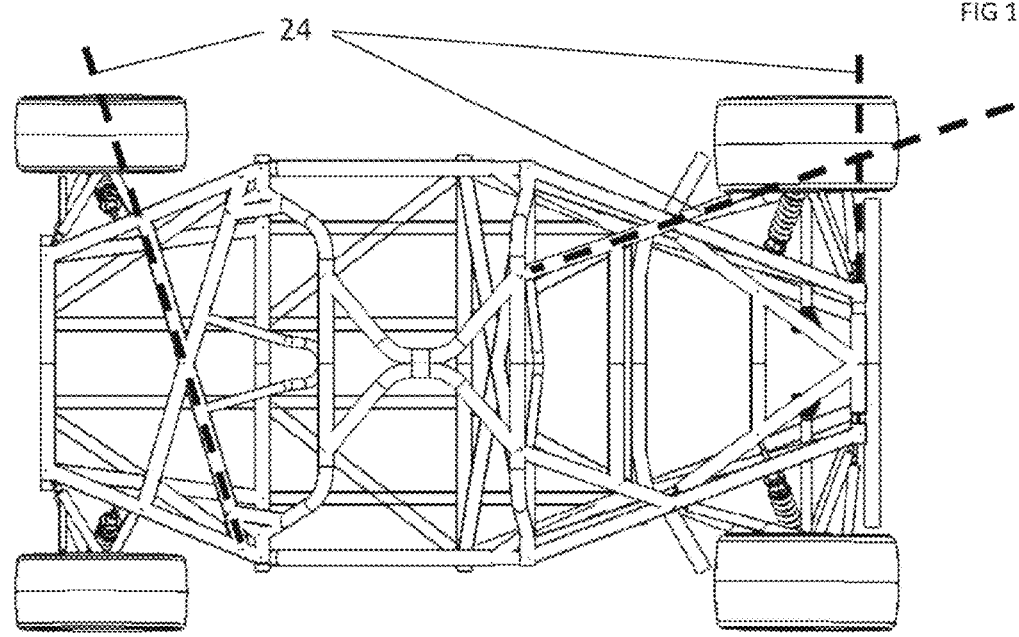
FIG 12 / A ARM TOP
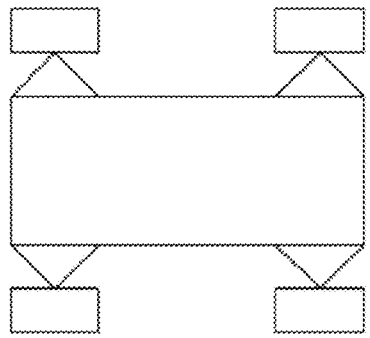
FIG 13 / A INLINE (PRIOR ART)
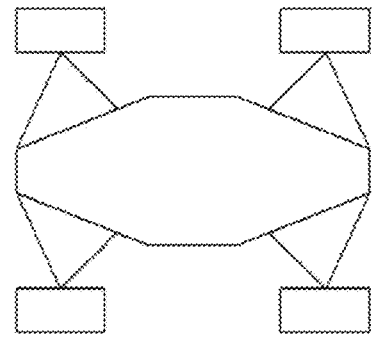
FIG 14 / A ARM ANGLED
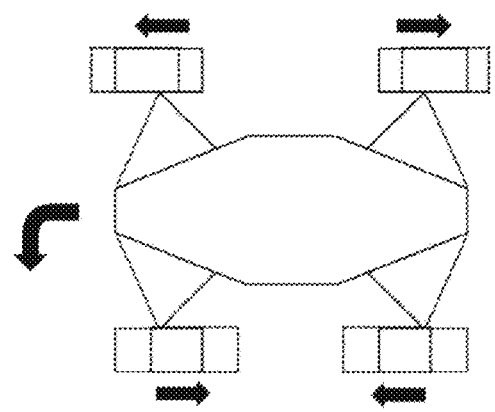
FIG 14A / WHEEL POSITION (VEHICLE TURN)
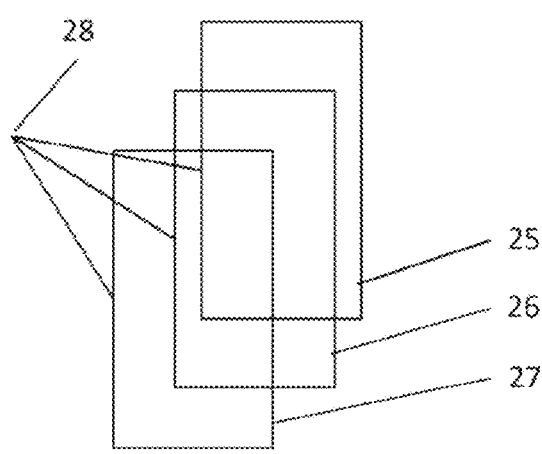
FIG 15 / a ARM / END VIEW

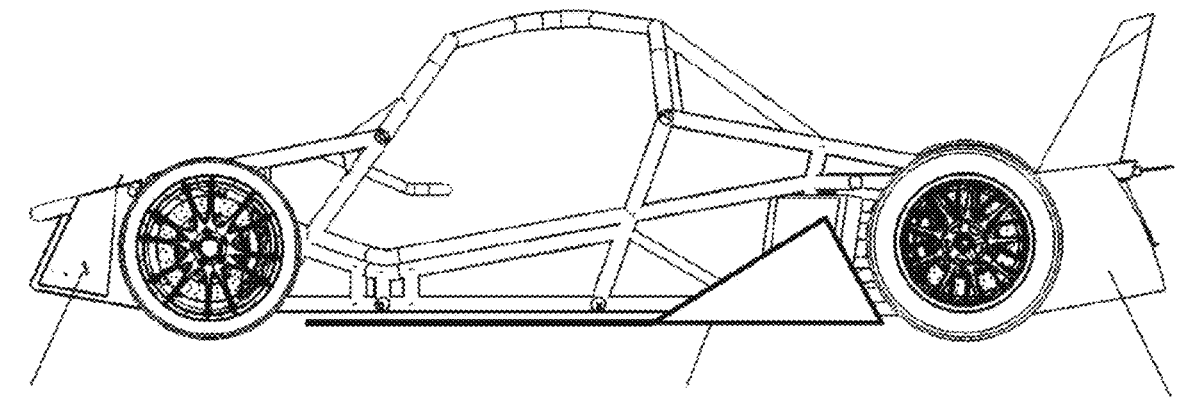
FIG 16 / AIR MANAGEMENT / SIDE
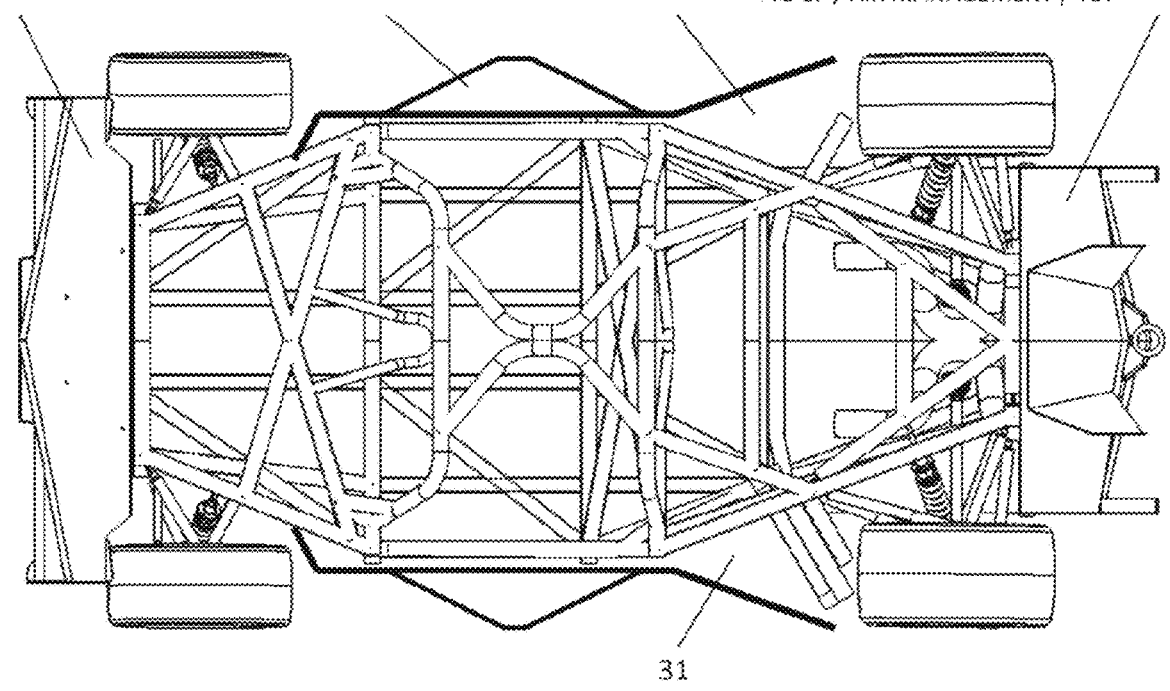
29   30   31   FIG 17 / AIR MANAGEMENT / TOP   32
31
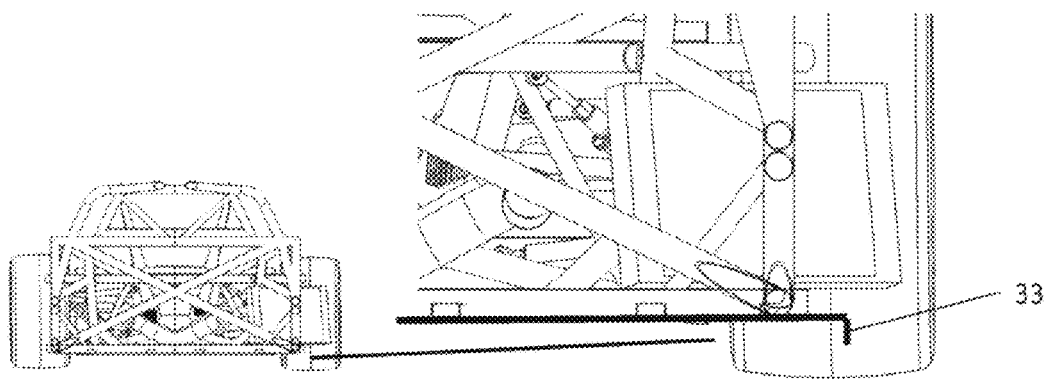
FIG 18 / AIR MANAGEMENT / END
33

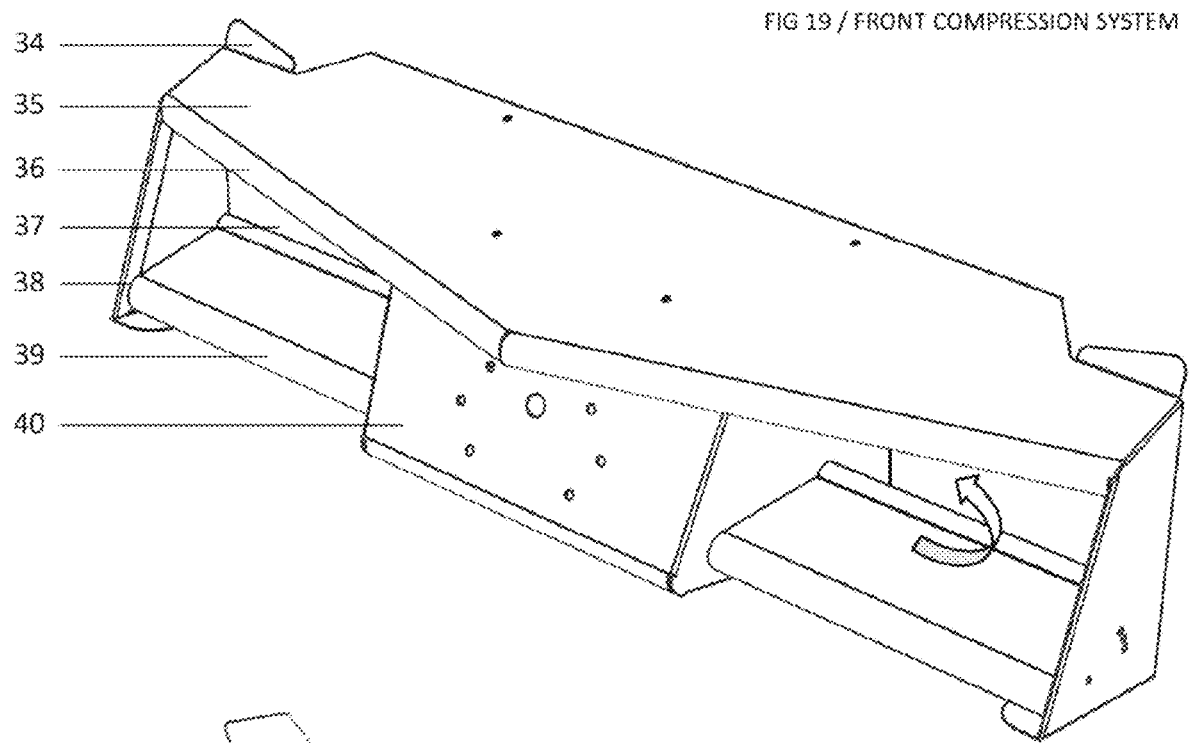
FIG 19 / FRONT COMPRESSION SYSTEM
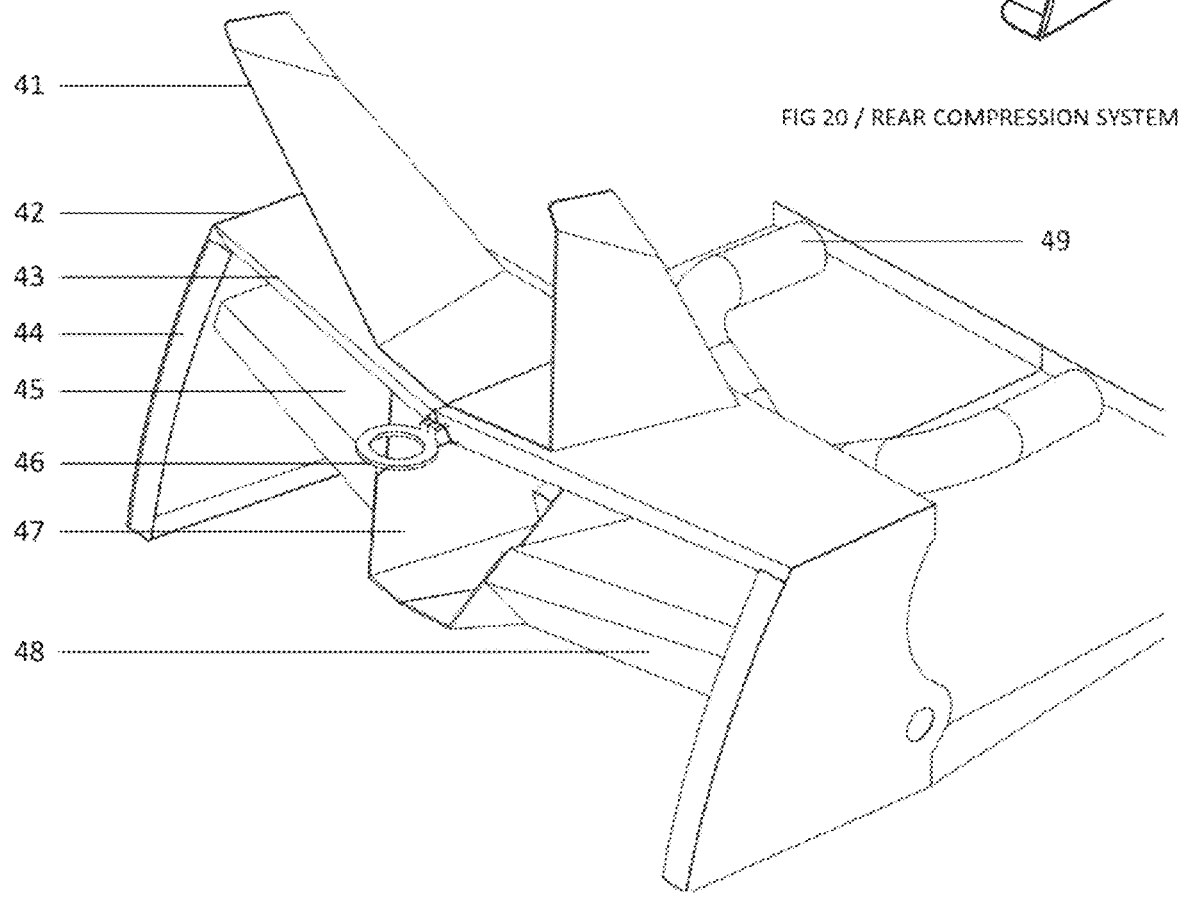
FIG 20 / REAR COMPRESSION SYSTEM

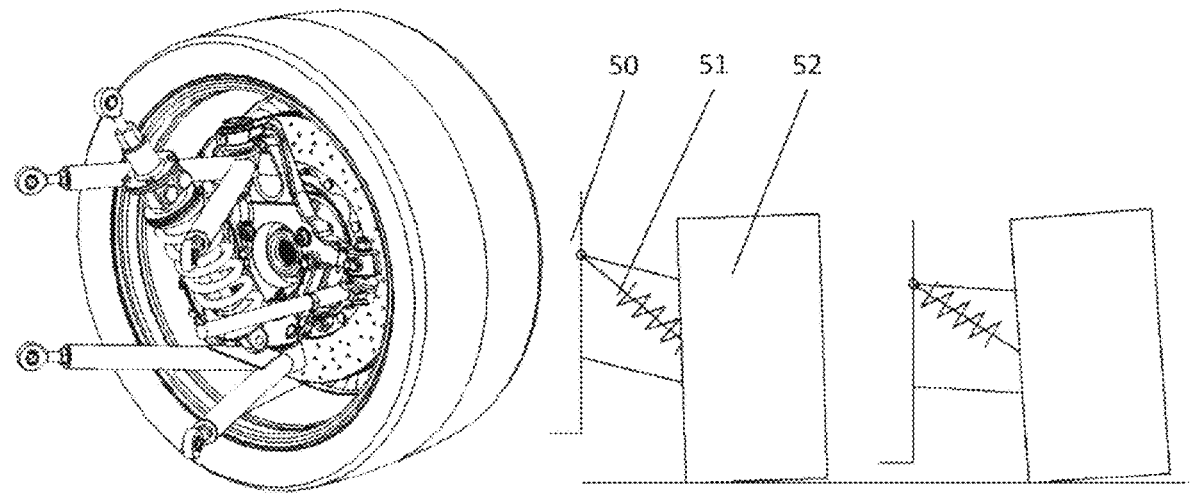
FIG 21 / SAMPLE ADJUSTER WHEEL ASSEMBLY
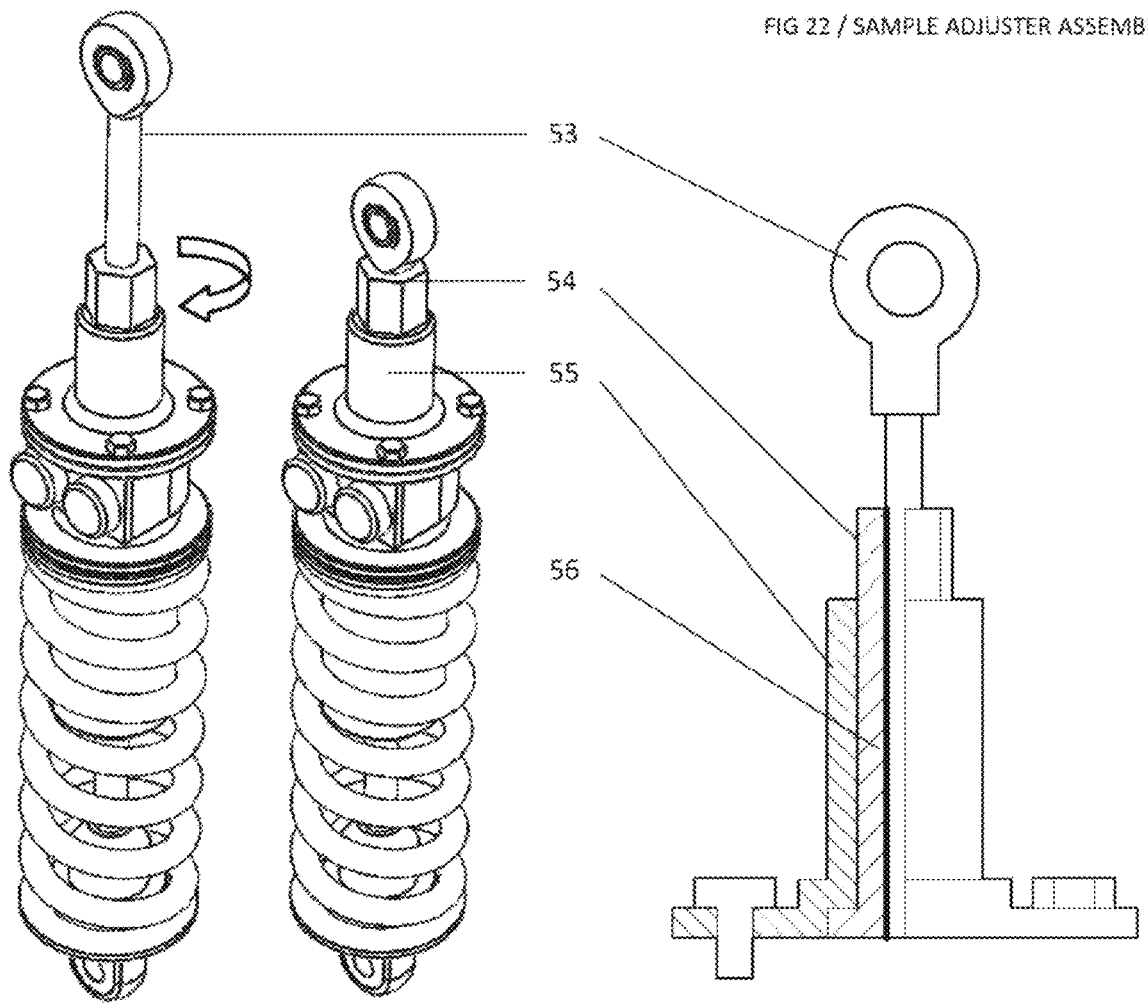
FIG 22 / SAMPLE ADJUSTER ASSEMBLY FIG 23 / MODIFIED MECHANISM
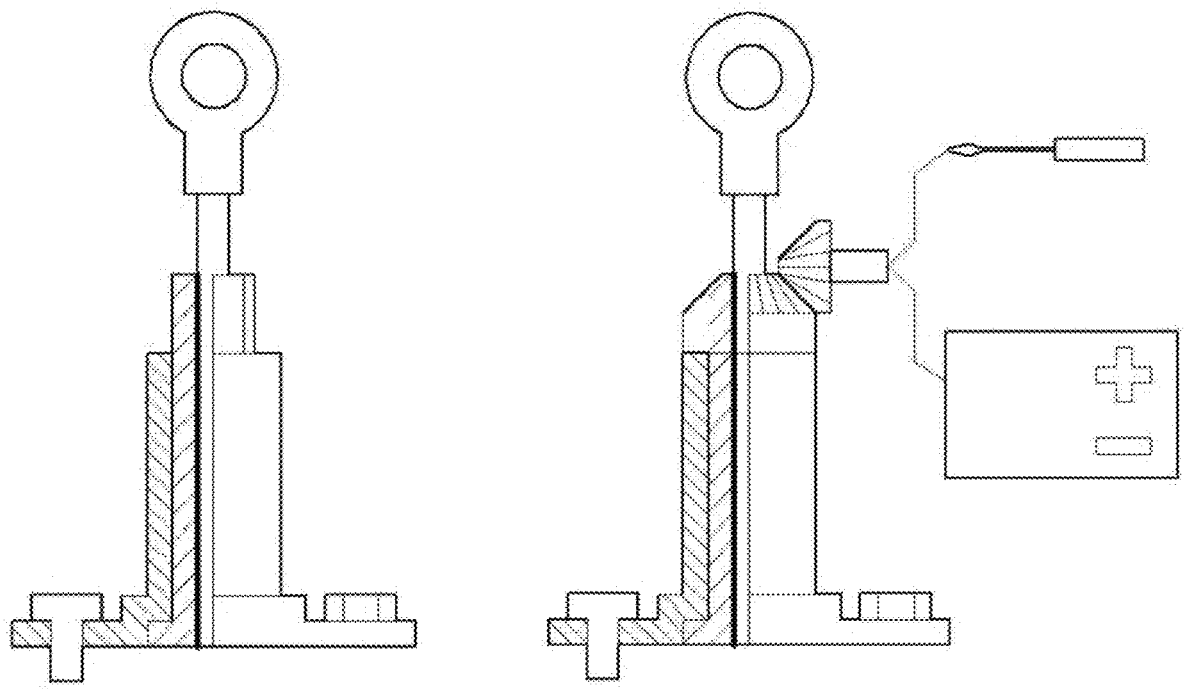
FIG 24 / ALTERNATIVE MECHANISMS
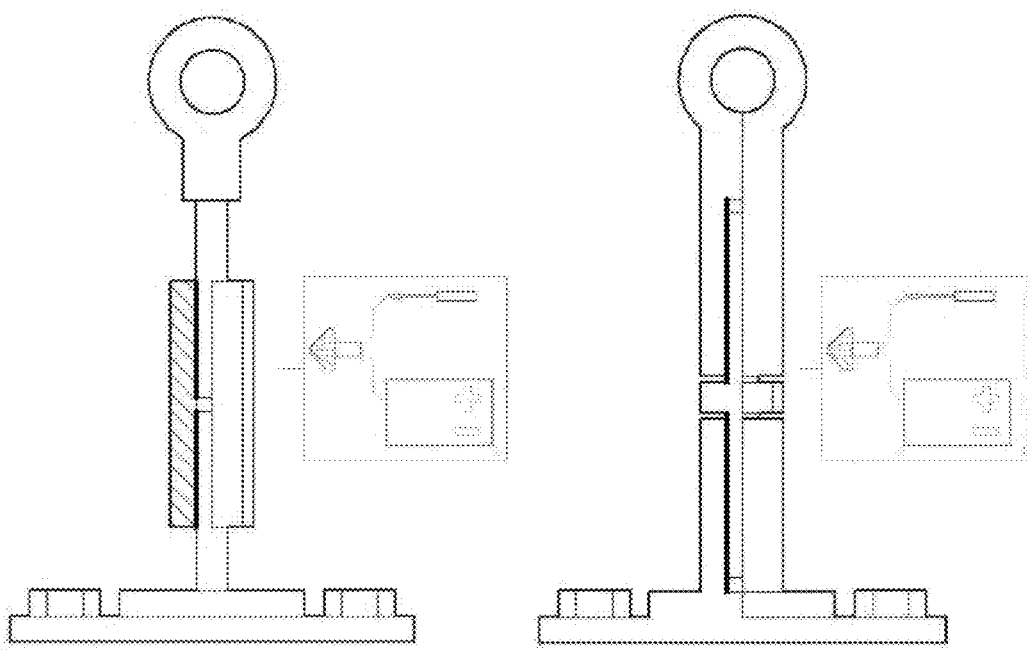

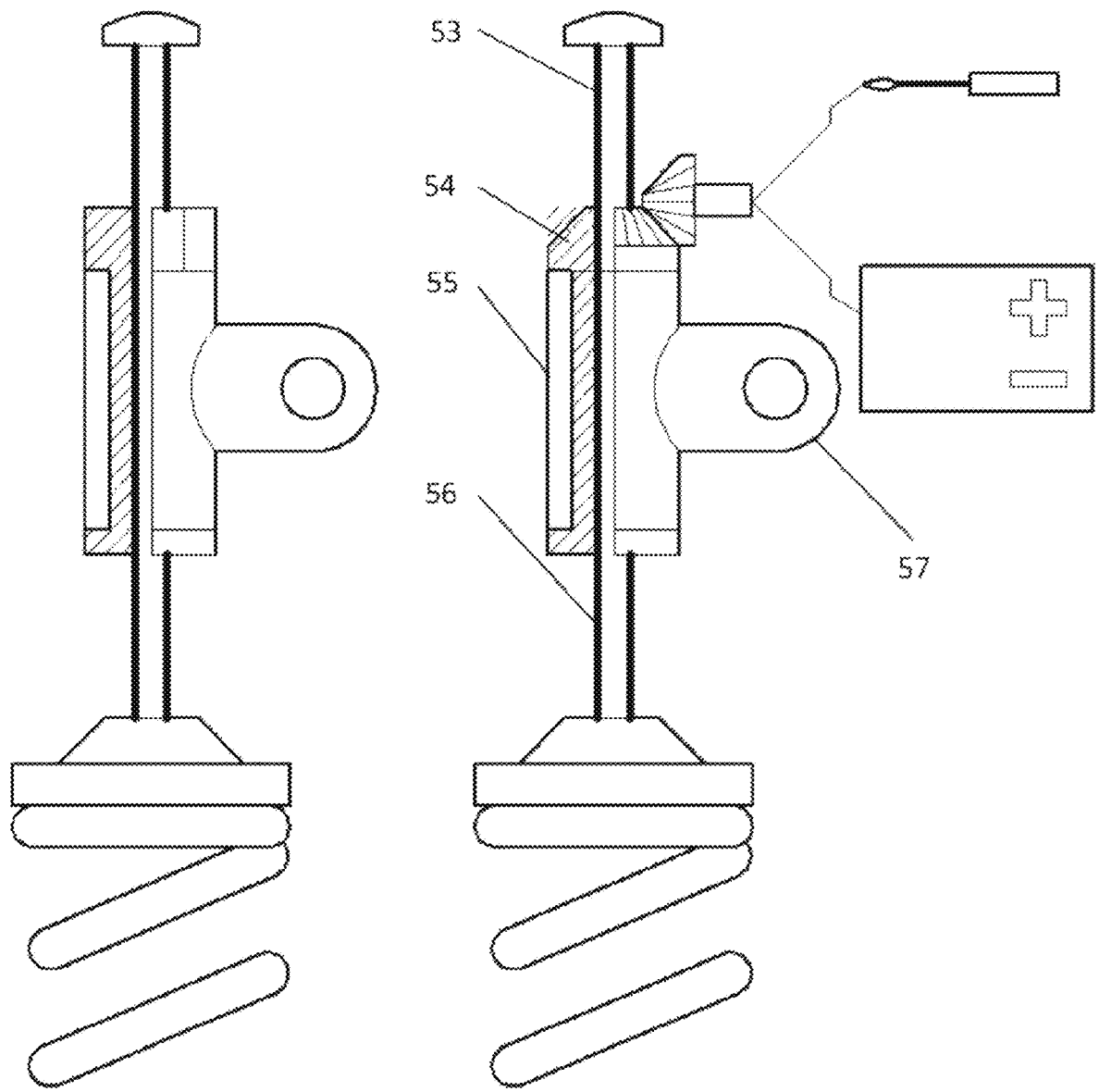

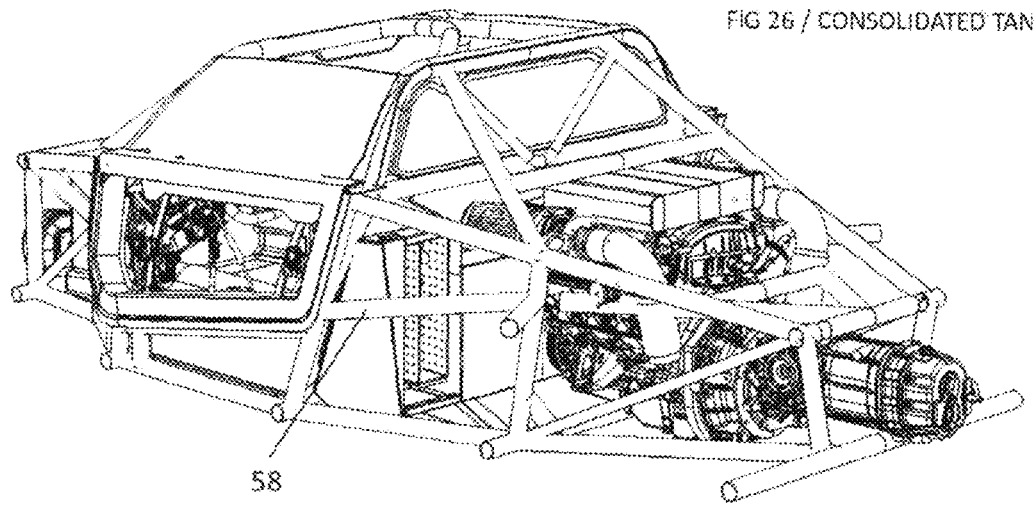
FIG 26 / CONSOLIDATED TANKS LOCATION
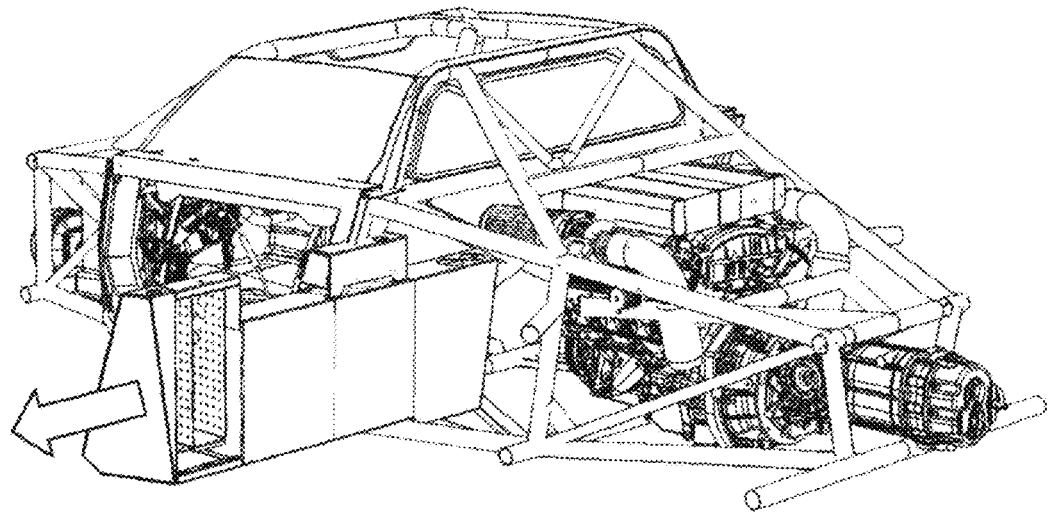
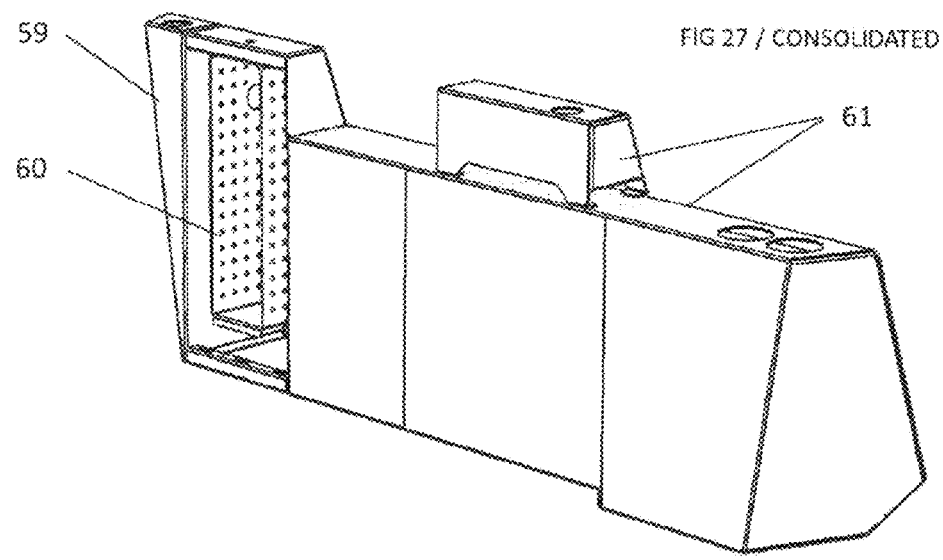
FIG 27 / CONSOLIDATED TANKS REMOVAL

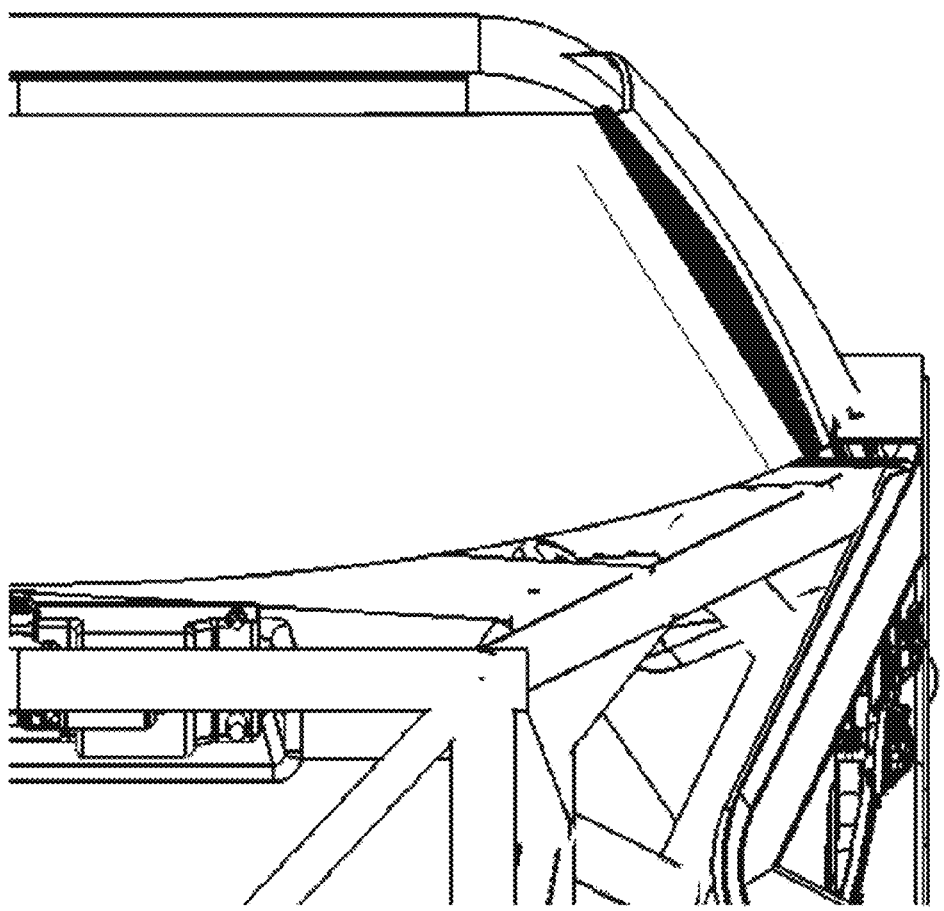
FIG 28 / SIDE GLASS TO FRAME ASY

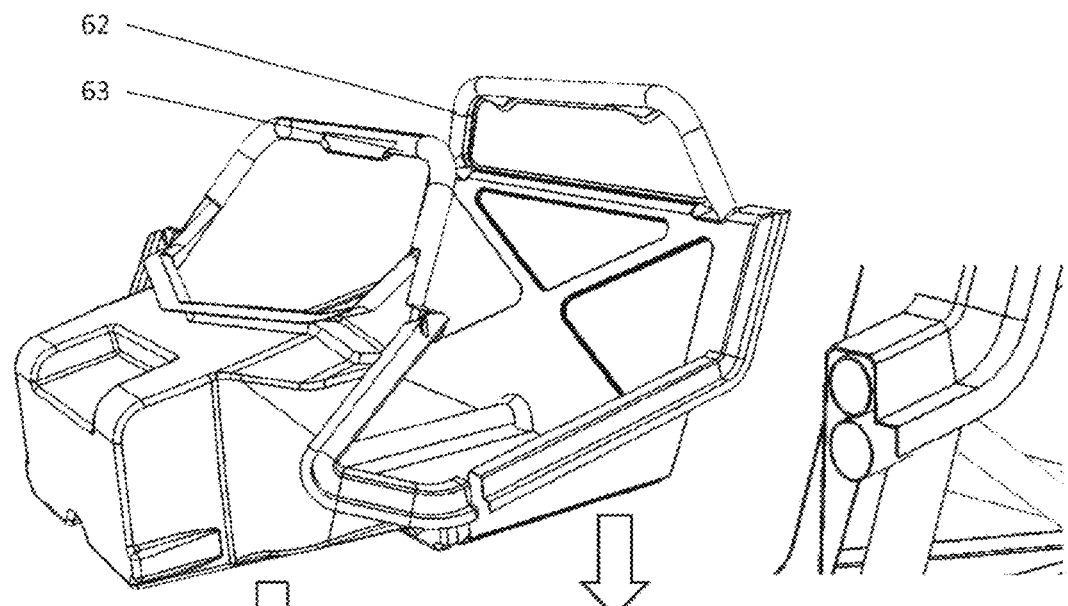
FIG 29 / 2 PART TUB
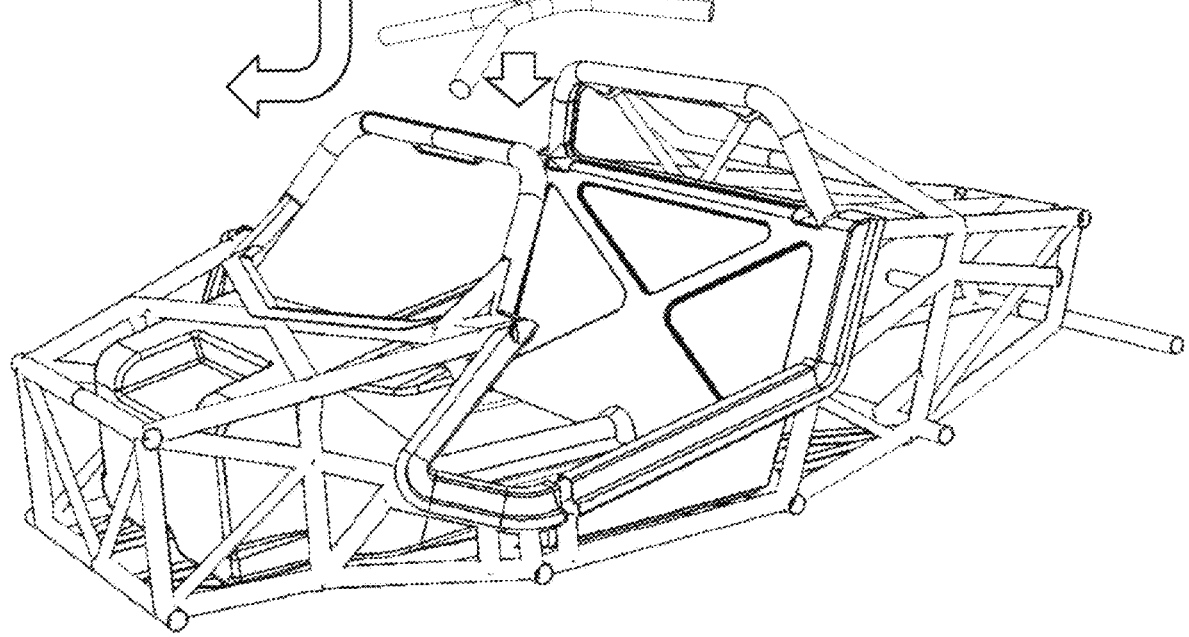
FIG 30 / TUB TO CHASSIS ASSEMBLY

FIG 31 / GLASS AND APRON OPTIONS
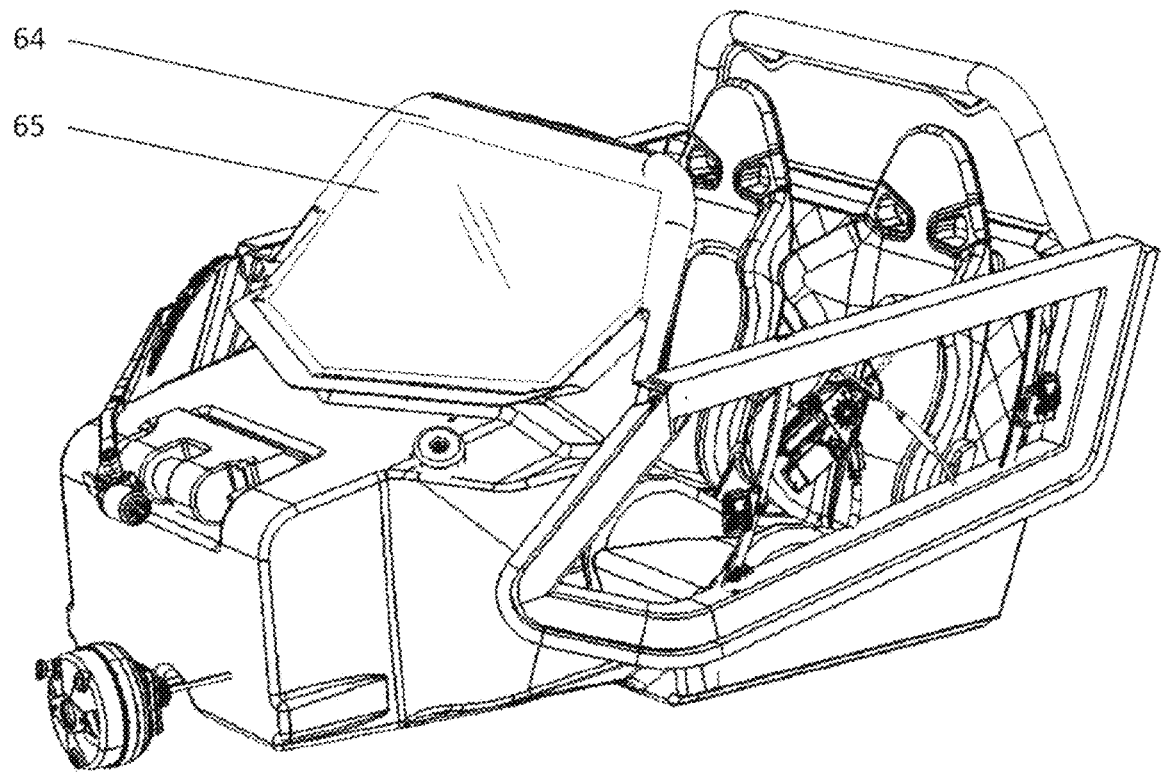
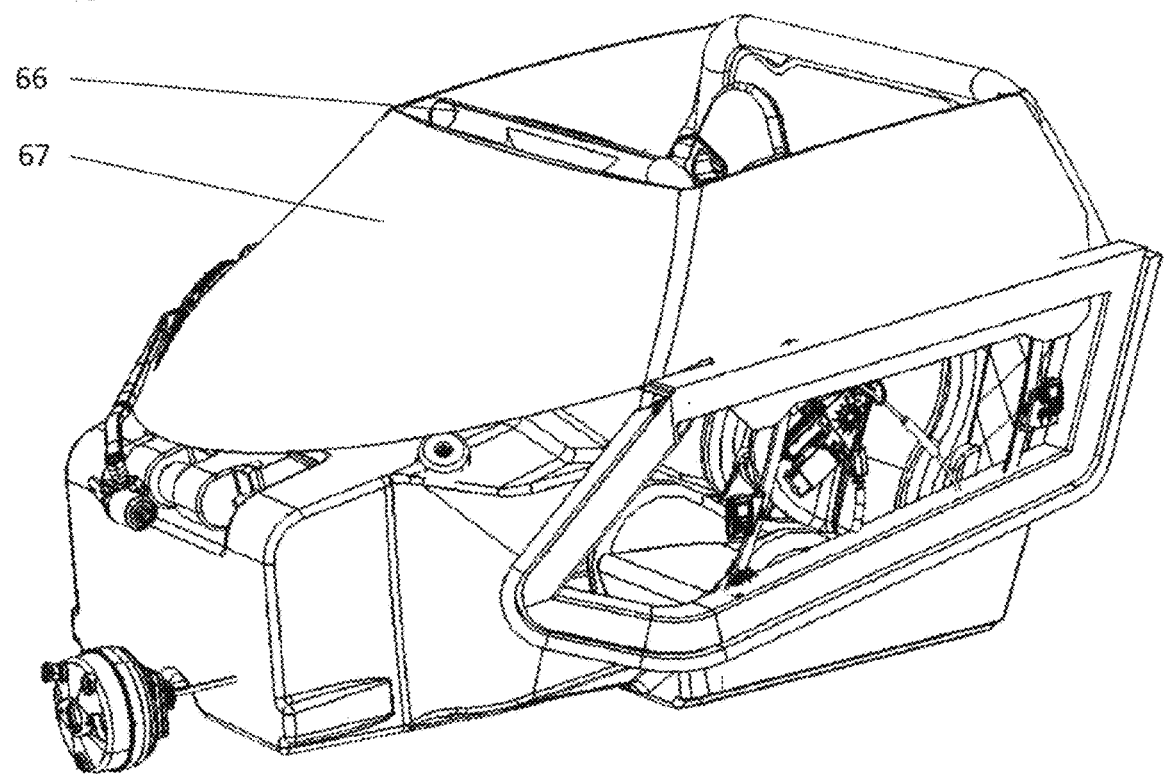

FIG 32 / FORWARD CABLE RUN
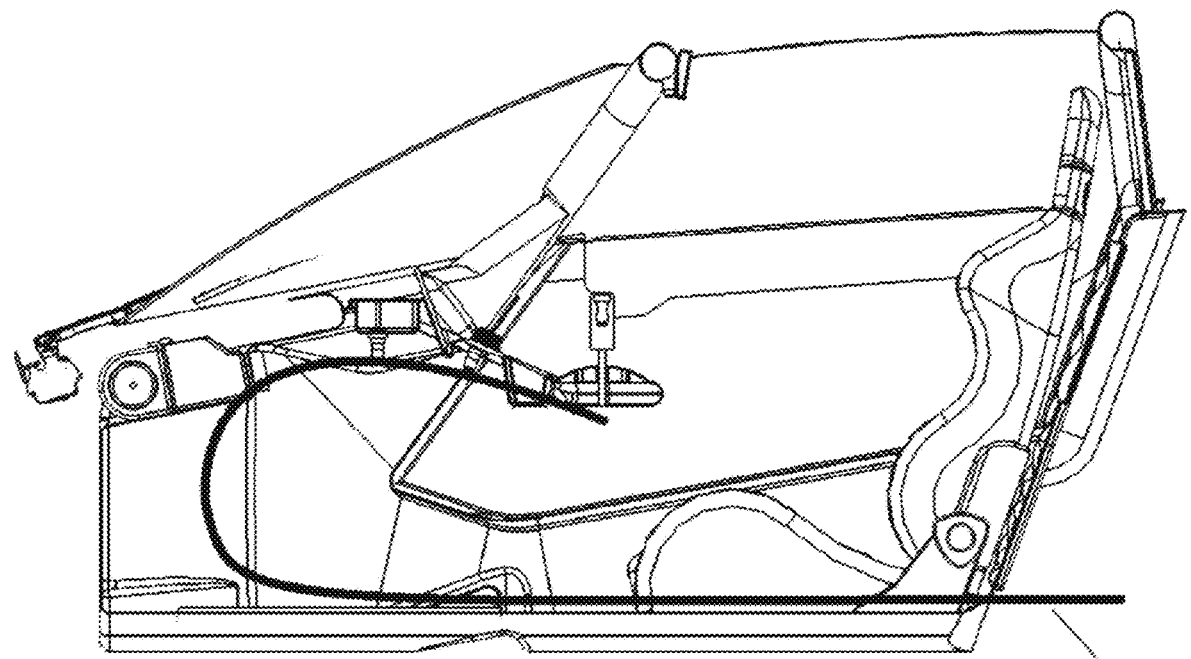
68
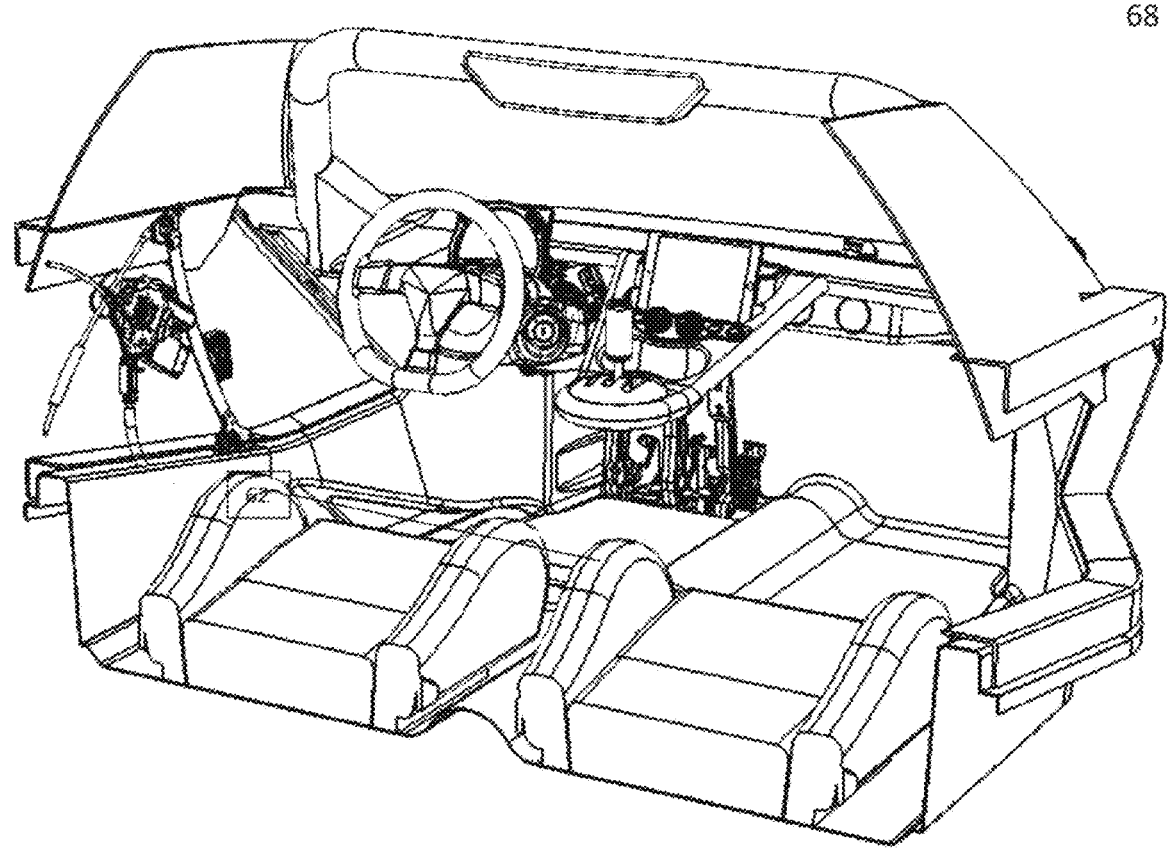

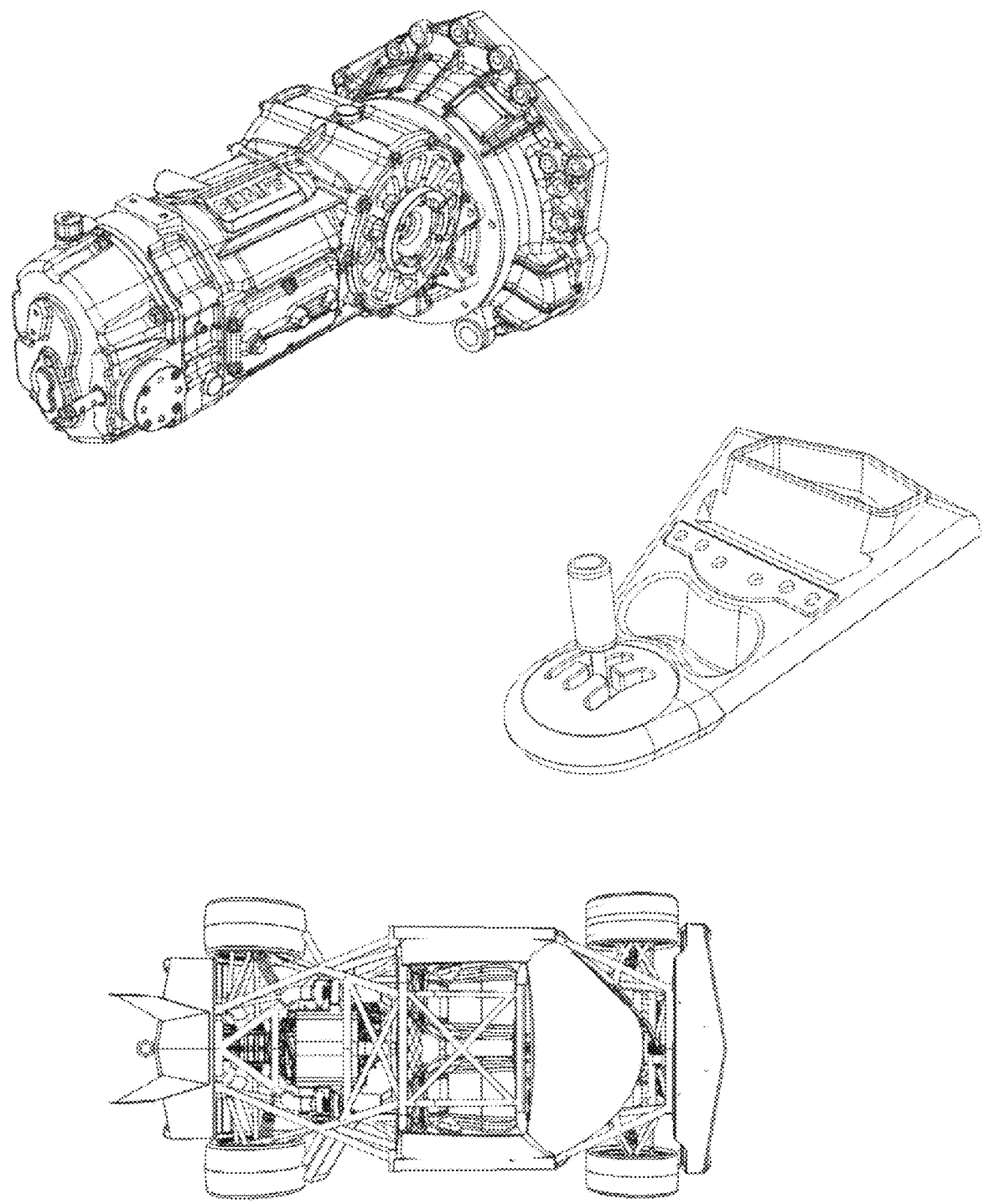

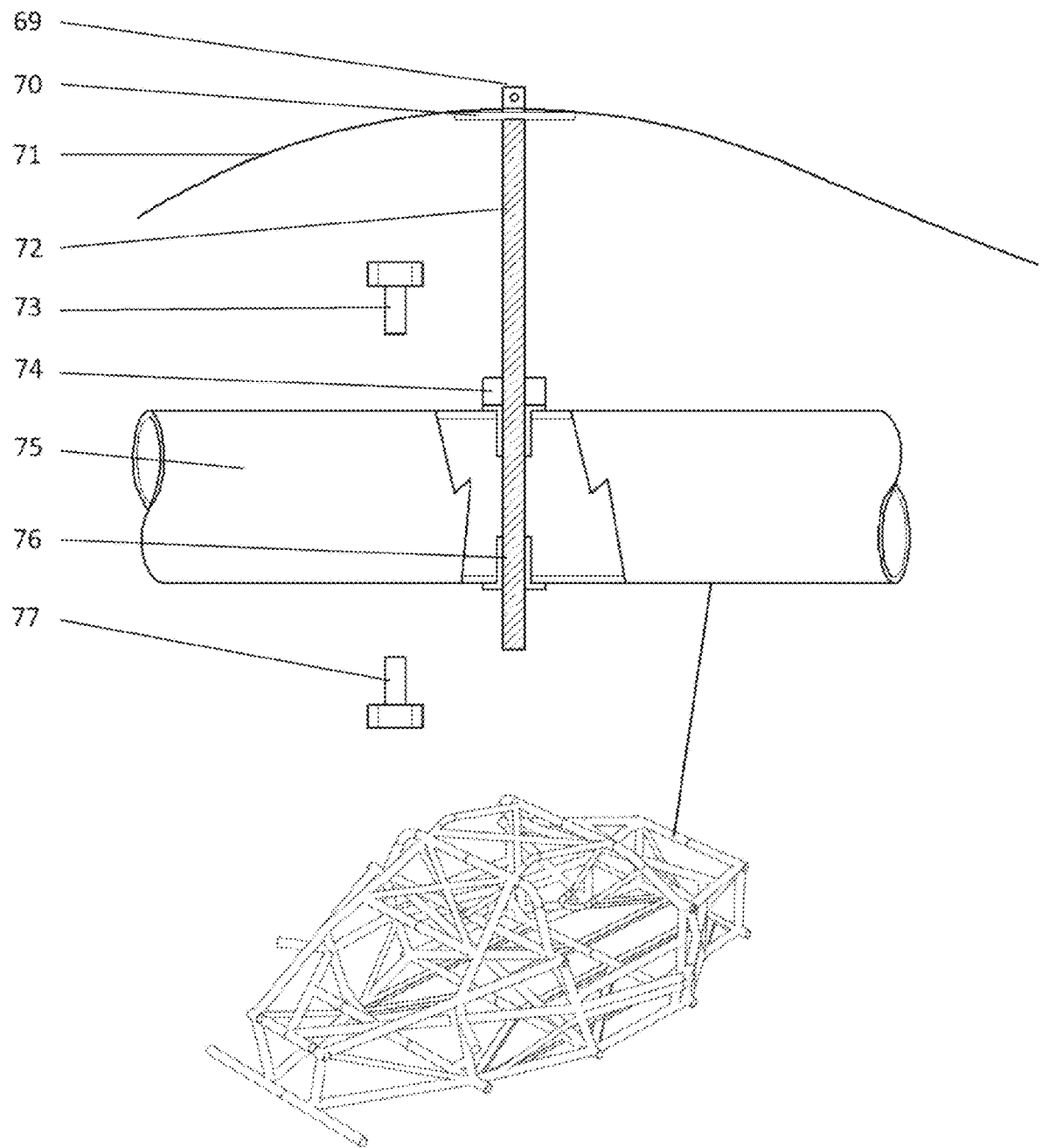

FIG 35 / BODY ASSEMBLY 1
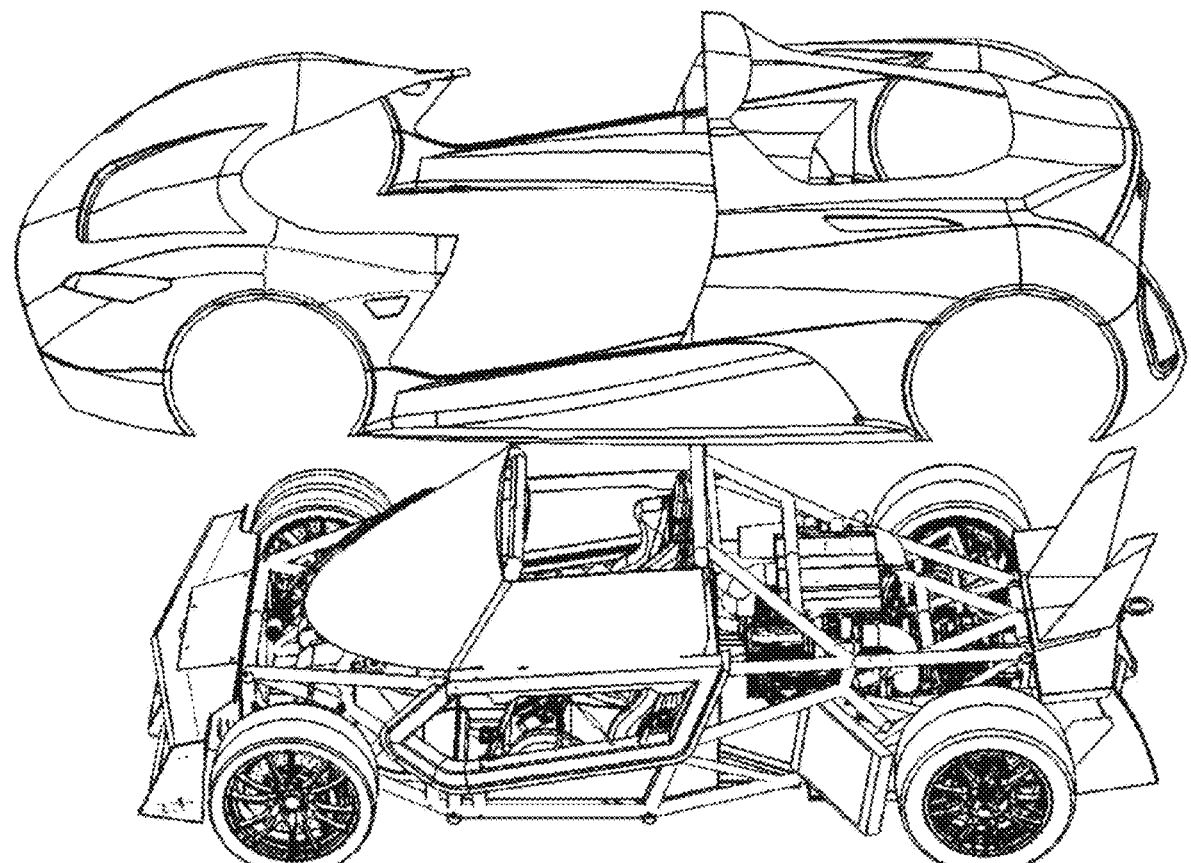
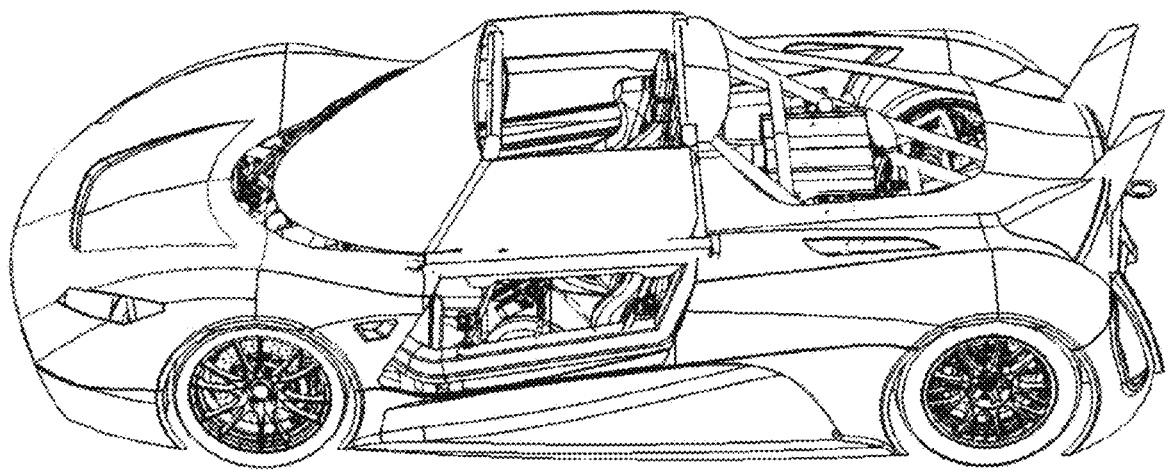

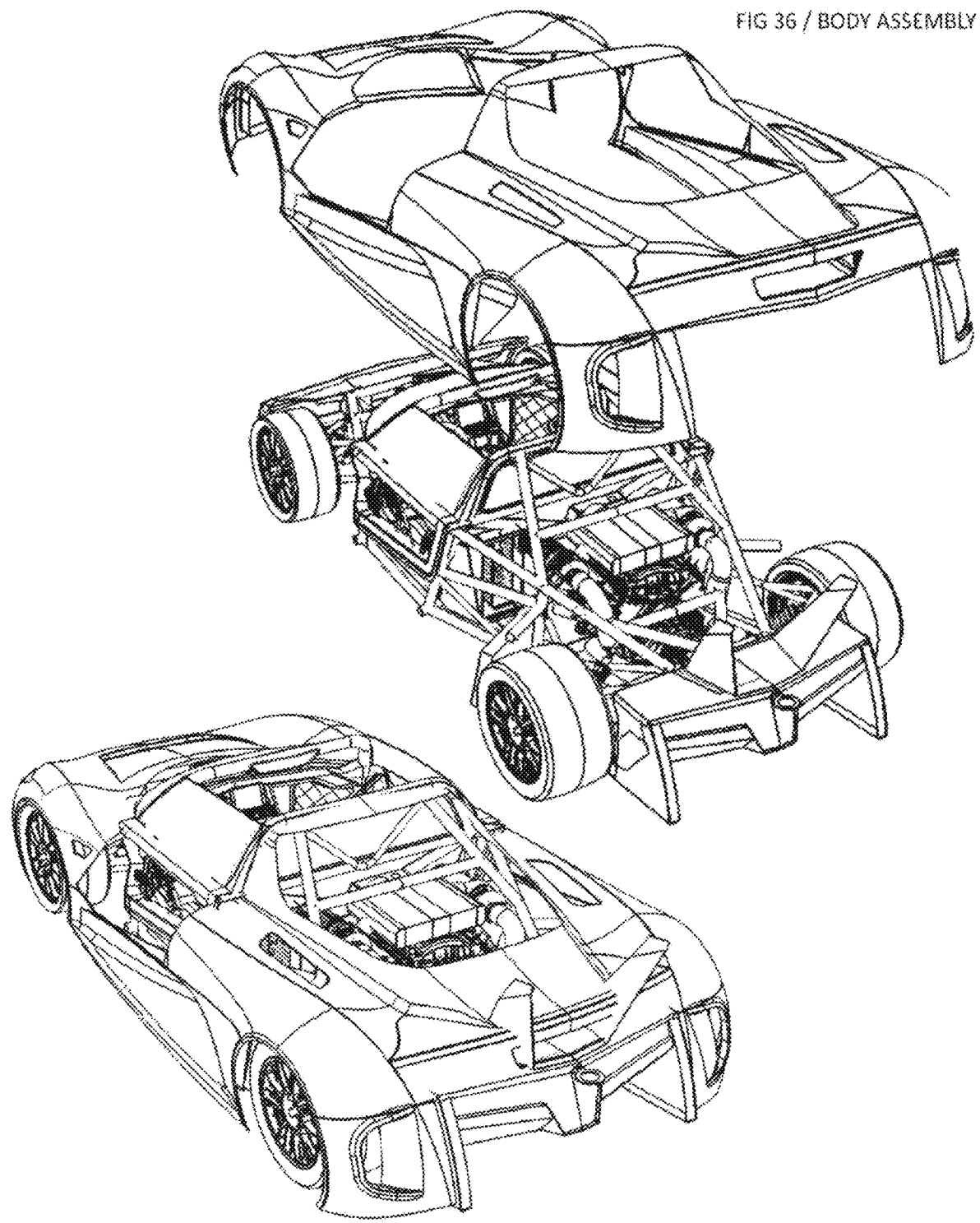
FIG 36 / BODY ASSEMBLY

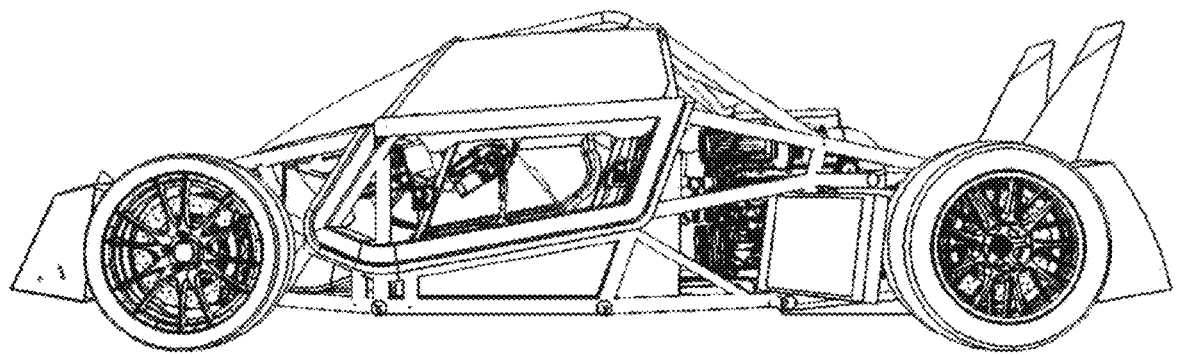
FIG 37 / NO BODY WITH TURBULENT AIRFLOW
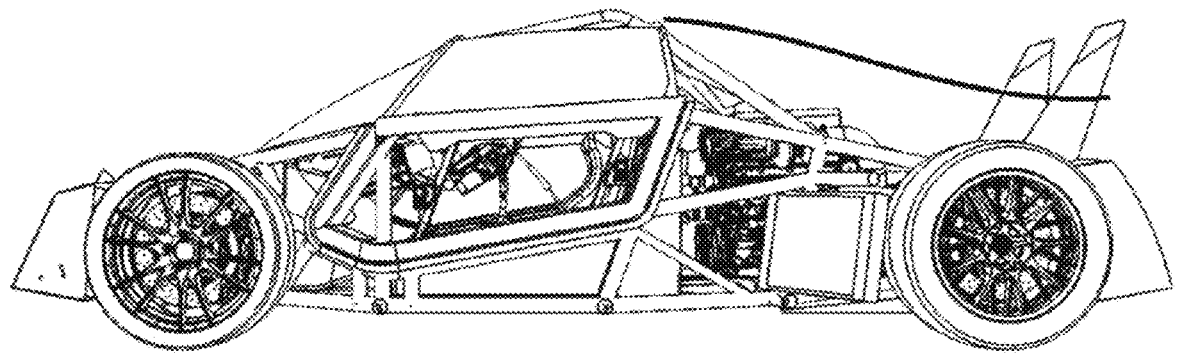
FIG 38 / BODY WITH GOOD AIRFLOW
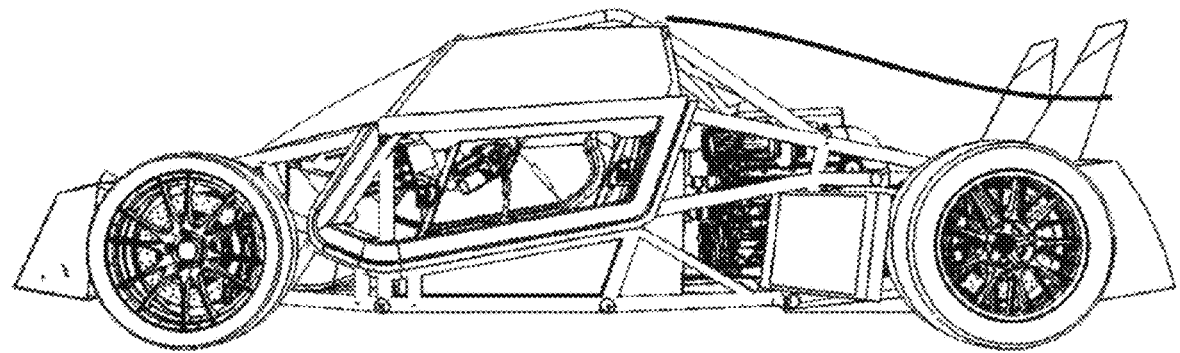
FIG 39 / BODY WITH LUGGAGE BOX

VEHICLE SYSTEM

CROSS REFERENCE TO RELATED APPLICATION

This application claims priority to U.S. Provisional Patent Application Ser. No. 61/931,507, filed Jan. 24, 2014 entitled, VEHICLE SYSTEM.

BACKGROUND OF THE INVENTION

1. Field of the Invention

The present application relates generally to the field of vehicles and vehicle assembly components and methods. More specifically, the present application relates to improved systems and methods for assembling vehicles that allow for enhanced customization of the vehicle during the post-sale period.

2. Background Information

Currently, wheeled transport vehicles (e.g., cars, trucks, buses, etc.) are manufactured to a mostly fixed specification (e.g., fixed body panels, fixed suspension height, etc.) at manufacturing facilities and are then shipped to an end user/customer to perform their intended function. From a manufacturing perspective, building to a mostly fixed specification speeds manufacture, streamlines inventory, and standardizes assembly processes which ultimately lowers overall manufacturing costs. For example, in the manufacture of most vehicles, there is some commonality of vehicle components between different vehicle platforms/models (e.g., common chassis, common body panels, common powertrain, etc.), which is cost effective for manufacturers at both the manufacturing and inventory levels. Furthermore, there is a cost savings in tooling because vehicle components that are manufactured from a single tool can be used on different vehicle platforms/models. Thus, it is advantageous for manufacturers to maintain a fixed specification across the different vehicles that they produce.

However, this is limiting in that the end user/customer is not free to substantially modify/customize their vehicle without investing significant amounts of time and money (such as for example, changing the vehicle ride height or the exterior body panels to give the vehicle a different appearance). Although most vehicles have some variability in their specifications, this variability allows for minor modifications of vehicle components (such as adding a sunroof changing wheels, upgrading audio systems, etc.) to occur at the factory or dealer level prior to vehicle delivery to the end user/customer (i.e., pre-sale period). Once the vehicle is in distribution and has reached the customer after sale (i.e., post-sale period), the vehicle and its components are essentially fixed. Thus, most vehicles are not manufactured/configured to be substantially modified/customized by the end user during the post-sale period.

SUMMARY OF THE INVENTION

An exemplary embodiment relates to an integrated vehicle system that enables an end user/customer to easily and substantially modify/customize various components (i.e., subsystems) of the vehicle during the post-sale period. According to various embodiments, the vehicle system may include any one or more of the following features or concepts:

Two or more laminated sill plates with members of varying profile;

Two or more laminated sill plates in vertical or horizontal orientation to resist chassis compression, bending loads, or side impact;

Two or more laminated sill plates that employ one or more bends in the length of the members;

Two or more laminated sill plates with additional support members at the point of maximum stress in any plane;

One or more sill plates, laminated or otherwise with uninterrupted load paths to the front and rear of the chassis;

One or more sill plates, laminated or otherwise with uninterrupted load paths to the front and rear of the chassis that may branch at their terminations into one or more paths;

An uninterrupted load path from the front of the vehicle to the rear;

An uninterrupted load path from the front of the vehicle to the rear that is comprised of a removable bracket for the purpose of providing clearance for a unitary engine and transaxle assembly removal;

An engine removal bracket in a triangular arrangement for structural integrity;

An engine removal bracket in a generally horizontal plane to provide a flat floor to serve as a luggage compartment;

An engine removal bracket from which a suspension assembly may be mounted to increase the stroke of a shock absorber for increased wheel travel;

A floor structure comprising front and rear generally triangular perimeter floor structures that generally direct loads around the occupant cell and engine compartment;

A generally weaved floor arrangement comprising one or more diagonal cross members to direct forces around the occupant cell;

One or more horizontal members extending from the front of the chassis to the rear of the occupant cell and positioned below the occupants;

One or more horizontal members extending from the front of the chassis to the rear of the occupant cell positioned below the occupants and including mounting holes to accept a seat, pedal fixtures, or the like;

A chassis recess point for front wheel clearance, that has a generally crossed configuration for strength and side impact resistance;

Two or more hollow housing members running transversely to internally house anti-roll bar componentry;

Two or more hollow housing members running transversely to internally house anti-roll bar componentry extending beyond the general perimeter of the frame;

One or more integrated third wheel axle housings, geometrically constrained within the acceptable balance guidelines for a trailer;

One or more integrated third wheel axle housings that extend beyond the general perimeter of the frame;

A front roll bar windshield combination having a generally planar configuration and extending down to lower tubular members of the vehicle chassis;

A permanent front buttress element coupled to the front roll bar or windscreen and extending down from the windscreen to the main chassis body in a triangular formation;

A permanent front buttress element on the front roll bar or windshield that creates a triangular section at the base of the roll bar, creating cantilevered triangulated rigidity for the otherwise (and necessarily) open four-sided front opening;

A vehicle chassis including a parting line that separates the front and rear of the vehicle completely;

A vehicle chassis including a parting line whereby all ancillary components do not traverse the parting line;

A vehicle chassis including a parting line whereby service wires or tubes have quick disconnects at the parting line;

A vehicle chassis including a parting line whereby either with a change to the front chassis the rear chassis a new intermediary chassis element or elements, or a combination of any of the above wherein a new function or aesthetic for the vehicle is produced;

A vehicle chassis including a parting line with front and rear roll bars and all other elements of the core chassis previously described;

An exterior body panel that is vertically separated into two major panels where either panel can be lifted up via a hinge or parallelogram moment using any combination of electro, manual, hydraulic device;

An exterior body panel that is vertically separated into two major panels where either panel can be lifted up via a hinge or parallelogram moment and seals against a sealing element approximately in the location of the parting line;

An exterior body panel that is vertically separated into two major panels where either panel can be lifted up via a hinge or parallelogram moment a features and a sensor similar to a garage door sensor that reverses the direction of travel if sensors detect an obstruction;

An exterior body panel that is vertically separated into two major panels where either panel can be lifted up via a hinge or parallelogram moment that feature some overlap, detent or lock, manual, mechanical or electronic at or about the parting line;

A removable bracket including a tow ring;

A triangular member directly attached within the rear roll bar and the rear buttress to prevent the vehicle chassis from collapsing;

A removable cross member which provides overhead protection and torsional resistance when used in combination with the front and rear roll bars and front and rear buttresses;

A removable cross member coupled directly to the rear buttress for optimal load transference;

A removable cross member comprising two or more members each with a single curve and assembled at an angle to provide a curved roof;

A removable cross member which provides overhead protection and torsional resistance when used in combination with the front and rear roll bars and front and rear buttresses;

A removable cross member including a curved rear portion to provide additional occupant head/helmet clearance;

A removable barn door which provides additional compression and side impact resistance and is configured to pivot in a generally upright plane to allow for occupant ingress/egress from the vehicle;

Angled A arms having longer arm length and angled pivot points wherein the angled A arms are coupled to the front and/or rear of a vehicle suspension;

Angles A arms to enable amore triangulated, smaller stronger chassis;

Angled A arms configured to enable a mechanical turn that changes the vehicle wheel base;

Angled A arms configured to allow for a wider track in the rear under acceleration;

Angled A arms configured to allow for a wider track in the front under braking;

Angles A arms with their inner arms mostly in line with the chassis members to dampen bump forces;

A chassis whereby a lower rear portion of the frame behind the passenger compartment angles upward progressively to allow for a larger volume of air to enter between the chassis and the ground;

A generally planar floor in combination with a folded side section to capture air and direct it into low volume chambers, such chambers being positioned in front of the radiators or the like, and configured to be triangular in shape;

A folded turn down of the edges of the flat floor with dimension of about 12 mm or 0.5 inch wherever the air flow is running parallel to the edges of the flat floor;

A front wing positioned between about 10 inch and about 24 inch from the ground and configured to be adjustable for an angle between about 3 and about 20 degrees;

A front wing positioned between about 10" and about 24" from the ground and configured to be adjustable for an angle between about 3 and about 20 degrees and coupled to a single or multi-piece front crush box;

A front wing with side plates extending downward from the outer area of the wing from which to attach an additional wing;

A front wing coupled to a front compression box wherein the front compression box is configured to be a single or multi-piece box, and said front wing configured to have side plates from which to install additional components;

A front compression system comprising a major wing and one or more minor wings, wherein the one or more minor wings are configured to be adjustable or non-adjustable, and one or more side plates coupled to a front compression box;

A front compression system comprising a major wing, wherein a peripheral edge serves as a bumper for the vehicle; one or more minor wings configured to be adjustable or non-adjustable, or alternatively two linking elements, or two side plates and a centrally located front compression box configured to be single or multi-piece;

A front compression system comprising a major wing, wherein a peripheral edge serves as a bumper for the vehicle; one or more minor wings configured to be adjustable or non-adjustable, or alternatively two linking elements, or two side plates and a centrally located front compression box configured to be single or multi-piece, and vertical lighting elements or recesses for such elements;

A front wing with a track tow ring protruding from a peripheral edge or positioned below a peripheral edge of the front wing;

A rear wing positioned between about 10 inch and about 24 inch from the ground and configured to be adjustable for an angle between about 3 and about 20 degrees;

A rear wing positioned between about 10" and about 24" from the ground and configured to be adjustable for an angle between about 3 and about 20 degrees, wherein the rear wing is coupled to a rear compression box configured to be a single or multi-piece box;

A rear wing with side plates extending downward from the outer area of the wing;

A rear wing with side plates extending downward. from the outer area of the wing from which to attach an additional wing or additional elements such as one or more mufflers;

A rear wing, mounted to a compression box in one or two pieces, said wing to have end plates from which to fasten additional elements;

A rear compression system comprising a major wing, one or more minor wings configured to be adjustable or non-adjustable wings, one or more muffler boxes, two side plates, and a centrally located rear compression box configured to be single or multi-piece;

A rear compression system comprising a major wing having a peripheral edge that operates as a vehicle bumper, one or more minor wings configured to be adjustable or non-adjustable or one or more muffler boxes or one or more linking elements, two side plates, and a centrally located rear compression box configured to be single or multi-piece;

A rear compression system comprising a major wing having a peripheral edge that operates as a vehicle bumper, one or more minor wings configured to be adjustable or non-adjustable or one or more muffler boxes or one or more linking elements, two side plates, a centrally located rear compression box configured to be single or multi-piece and vertical lighting elements or recess for such elements;

A rear wing with an integrated track tow ring protruding from a peripheral edge or positioned below a peripheral edge of the wing;

A rear wing and rear compression box structure including an integrated tow hook passing through the assembly;

A rear wing assembly including a centrally located rear compression box and one or more mufflers with a space between the wing and mufflers to vent air from an area preceding the assembly;

An adjustable suspension unit including an extending member coupled to a suspension mechanism or integrated within a suspension unit;

An adjustable suspension unit including a threaded extending member within a chassis mounting point at its end coupled to a suspension mechanism, whereby the member may be extended without removing a part of the member from the suspension mechanism or the entire assembly from the vehicle;

An adjustable suspension unit including a threaded rod, threaded rotating center element, and a collar;

An adjustable suspension unit including a threaded adjuster which does not require removal of one end of the suspension assembly to adjust, and can operate manually with a wrench;

An adjustable suspension unit including a threaded adjuster which does not require removal of one end of the suspension assembly and can be operated via 90 degree gear;

An adjustable suspension unit which does not require removal of one end of the suspension assembly and can be adjust via a 90 degree gear coupled to either a powered drive or manual element such as a nut, a cross head, or a socket for operation;

An adjustable suspension unit including alternative mechanisms using any combination of threads, left or right, with male or female collars, scissor jacks or the like;

An adjustable suspension unit including alternative mechanisms using any combination of threads, left or right, with male or female collars, scissor jacks or the like, and are configured to be operated via a 90 degree gear coupled to either a powered drive or manual element such as a nut, a cross head, or a socket for operation;

An adjustable suspension unit including a long threaded member affixed to a suspension assembly or component, encompassed by a mating threaded collar with an adjustment mechanism at its end, with the mating collar encased in a housing with the housing having a mounting point to affix to the vehicle;

An adjustable suspension unit that is adjustable either manually via a threaded collar, manually via a mechanism that turns access 90 degrees such as a pair of 45 degree gear wheels, or powered via an onboard electric motor or other power supply;

An adjustable suspension unit which can extend itself in length and can be operated via a power source such as an electric motor that can be housed on the vehicle or on the mechanism itself;

An adjustable suspension unit including a mounting point that contains within it a spherical bearing such as a hem or rose joint;

A modular tank and electrical system configured to consolidate one or more fluids and electrical components listed such as: Gas, water, oil, washer fluid, overflow tanks, air pressure tanks, battery, ECU, ABS, rectifiers, regulators, or fuse box;

A modular tank and electrical system configured to be unitary in location sometimes unitary in a physical sense or a combination;

A modular tank and electrical system configured to include one or more trays, racks, holders or other unifying structures for the purpose of removal, installation, and service;

A modular tank and electrical system including a removable chassis bracket;

A chassis bracket wherein the bracket has a generally triangular profile;

A modular arrangement of tank boxes and elements that may be added or removed from time to time;

A tubular exoskeleton wrapped tub;

A chromoley exoskeleton wrapped carbon fiber tub;

A cabin or formed tub in two pieces top loading into a tube chassis with no roof, and a roof bracket subsequently applied to fully enclose the structure;

A cabin or tub cut horizontally into two overlapping pieces top loading into a space frame, the front first dropping down and then pushing forward into the foot well area;

A cabin or tub cut vertically into 2 overlapping pieces top loading into a space;

A tub fitting into a space frame chassis with a perimeter flange generally following the contours of the space frame edges and covering them with a 180 degree flange;

An automobile passenger tub with a flange that generally follows and overlaps the contours of an automobile space frame with an appropriate tolerance, except every now and again interspersed with constriction to a tighter tolerance;

An automobile passenger tub with a flange that generally follows and overlaps the contours of an automobile space frame with an appropriate tolerance, except every now and again interspersed with constriction to a tighter tolerance and an additional flange for fitment to additional components such as a roof and doors;

An automobile tub fitted into a space frame automotive chassis with a generally form fitting recess on the tub to accept an automotive air conditioning unit;

An exterior apron approximately matching the front roll bar and interior tub to house a flat windshield and a matching apron to house a curved windscreen, with both windscreen sealing against a common side window seal;

An exterior apron approximately matching the front roll bar and interior tub to house a flat windshield and a matching apron to house a curved windscreen, with both windscreen sealing again a common side window seal;

A cantilevered center console, cantilevered from the dashboard, a gear change cable that first runs forward into the foot well under the dashboard before traversing under the floor to the motor compartment;

Runners to match glass curvature to straight frame tubes, molded or machined;

A remote wired or wireless connection between an operator's gear lever or switch and a gearbox lever via a solenoid for activation whereby the solenoid is not directly connected to the gearbox lever but is connected by an intermediary spring element;

A spring element that can be of any shape or arrangement and in any material such as ferrous or composite and may also be pneumatic, or an air-based spring;

A remote wired or wireless connection between an operator's gear lever and a gearbox lever connected via force feedback solenoids whereby the operator gear lever's rotation turns the gearbox lever's rotation and vice versa;

A powered manual shifter that still provides feedback to the operator;

A mechanism to affix body styles of different shapes, size and material to a generally common chassis via threaded body rods;

Threaded body rods with flange or washer and fastening mechanism on one end;

A threaded body rod that passes part are all the way through a chassis panel or tube;

A chassis panel that may contain a threaded bung and a bolt for unused body rod locations;

A chassis panel with a threaded section such as a riv-nut;

A rear roof and tail body panel with a large aperture opening combined with an open underside whereby air from the exterior of the vehicle can readily flow into, through and exit;

A simple cover for the large aperture opening to keep the airflow smooth;

A large removable luggage tub to reside underneath the simple cover, whereby the simple cover can act as a cover for the tub; and A lock configured to secure the tub and cover.

BRIEF DESCRIPTION OF THE DRAWINGS

A full understanding of the invention can be gained from the following description of the preferred embodiments when read in conjunction with the accompanying drawings in which:

FIG. 1 is a side view of a vehicle chassis according to an exemplary embodiment;

FIG. 2 is a top view of the vehicle chassis of FIG. 1;

FIG. 3 is a perspective view of the vehicle chassis of FIG. 1;

FIG. 3A is a perspective view of the vehicle chassis of FIG. 1 including an anti-roll bar assembly according to an exemplary embodiment;

FIG. 3B is a perspective view of the anti-roll bar assembly of FIG. 3A according to an exemplary embodiment;

FIG. 4 is another perspective view of the vehicle chassis of FIG. 1;

FIG. 5 is a bottom view of the vehicle chassis of FIG. 1 depicting a floor structure and load paths;

FIG. 5A is a side view of a vehicle chassis including a parting line according to an exemplary embodiment;

FIG. 5B is a side view of the vehicle chassis of FIG. 5A with different exterior body panels according to an exemplary embodiment;

FIG. 6A is a front view of the vehicle chassis of FIG. 1;

FIG. 6B is a rear view of the vehicle chassis of FIG. 1;

FIG. 7 is a perspective view of a vehicle chassis according to an exemplary embodiment;

FIG. 8 is a side view of the vehicle chassis of FIG. 7 according to another exemplary embodiment;

FIG. 9 is a top view of the vehicle chassis of FIG. 7 depicting a torsional load applied to the chassis and a corresponding load line;

FIG. 10 is a perspective view of a vehicle chassis according to another exemplary embodiment;

FIG. 11 is a side view of the vehicle chassis of FIG. 10 depicting a horizontal compression load applied to the chassis;

FIG. 12 is a top view of a vehicle chassis depicting load paths according to an exemplary embodiment;

FIG. 13 is a top view of a prior art vehicle suspension having A arms with aligned pivot points;

FIG. 14 is a top view of a vehicle suspension having A arms with angled pivot points according to an exemplary embodiment;

FIG. 14A is a top view of a vehicle suspension having A arms with angled pivot points during a left turn according to an exemplary embodiment;

FIG. 15 is a top view of three different wheel positions according to an exemplary embodiment;

FIG. 16 is a side view of a vehicle chassis including underfloor air management components according to an exemplary embodiment;

FIG. 17 is a top view of the vehicle chassis of FIG. 16;

FIG. 18 is a rear view of a vehicle chassis including an underfloor air management component according to an exemplary embodiment;

FIG. 19 is a perspective view of a front compression system according to an exemplary embodiment;

FIG. 20 is a perspective view of a rear compression system according to an exemplary embodiment;

FIG. 21 is a front/perspective view of an adjustable suspension unit according to an exemplary embodiment;

FIG. 22 is a perspective view and a cross-section view of an adjustable suspension unit according to an exemplary embodiment;

FIG. 23 is a cross-section view of two adjustable suspension units according to an exemplary embodiment;

FIG. 24 is a cross-section view of two adjustable suspension units according to an exemplary embodiment;

FIG. 25 is a cross-section view of two adjustable suspension units according to an exemplary embodiment;

FIG. 26 is a perspective view of an exemplary installation of a modular tank and electrical system according to an exemplary embodiment;

FIG. 27 is a perspective view of the modular tank and electrical system of FIG. 26;

FIG. 28 is a front view of an integrated vehicle system including a side glass panel according to an exemplary embodiment;

FIG. 29 is a perspective view of front and rear interior tubs according to an exemplary embodiment;

FIG. 30 is a perspective view of an exemplary installation of the front and rear interior tubs of FIG. 29;

FIG. 31 is a perspective view of front and rear interior tubs according to various exemplary embodiments;

FIG. 32 is a side view and a perspective view of an integrated vehicle system including a gear shift cable according to an exemplary embodiment;

FIG. 33 is a perspective view of a gear shift system according to various exemplary embodiments;

FIG. 34 is a cross-section view of modular body panel assembly according to an exemplary embodiment;

FIG. 35 is a perspective view of an exemplary installation of a body panel assembly according to an exemplary embodiment;

FIG. 36 is another perspective view of an exemplary installation of a body panel assembly according to another exemplary embodiment;

FIG. 37 is a side view of a vehicle according to an exemplary embodiment;

FIG. 38 is a side view of a vehicle according to another exemplary embodiment; and FIG. 39 is a side view of a vehicle according to yet another exemplary embodiment.

DESCRIPTION OF THE PREFERRED EMBODIMENTS

As will be discussed in greater detail herein, the present application relates to vehicles and assembly systems and methods therefor that advantageously allow for enhanced customization of the vehicle, such as to allow the simple and efficient customization of safety, comfort, performance, service, speed, and cost functions. The components of the vehicle are configured to work together in a manner that provides for weight savings, improved performance and safety, lower cost, and improved ease of use.

It should be noted at the outset that although the present description relates in particular to a performance vehicle (sometimes referred to colloquially as sports cars or supercars), the concepts discussed herein may be applicable to other types of vehicles as well (e.g., cars, trucks, transport vehicles, buses, and the like). Accordingly, the concepts herein should not be considered as being limited only to the manufacture of performance vehicles, since such concepts may also be used with the production of other types of vehicles, all of which are intended to fall within the scope of the present disclosure.

In particular, the present application relates to an integrated vehicle system that is configured to enable substantial customization of the system during the post-sale period by or on behalf of an end user/customer. In various exemplary embodiments, the integrated vehicle system comprises various sub-systems that allow for the enhanced customization of the vehicle. Each of the various vehicle sub-systems are discussed in turn below.

Referring generally to FIGS. 1-6B, in an exemplary embodiment, a core vehicle chassis having a plurality of tubular members is shown. The tubular members are configured to have a maximum strength to minimum weight ratio and are arranged to provide increased safety for vehicle occupants (e.g., crash impact, rollover, etc.) and improved system flexibility to accommodate different vehicle configurations. The chassis shown in FIGS. 1-6B can be configured to be a convertible or a roadster with a hard top (e.g., a coupe). In other exemplary embodiments (not shown), the chassis can be configured to be a truck, a transport vehicle, a bus, or the like.

According to an exemplary embodiment shown in FIG. 1, the core vehicle chassis includes two pairs of laminated sill plates 6 arranged generally horizontally and parallel with each other, and extending along the length (i.e., from the front to the rear) of each side of the vehicle chassis. The laminated sill plates 6 are coupled between tubular members extending up from the vehicle chassis floor/base. The sill plates 6 can be coupled to the tubular members using various methods such as welding, fasteners, or the like. The laminated sill plates 6 are configured to provide a generally horizontal and uninterrupted load path (e.g., a force path) from the front to the rear of the vehicle chassis, as well as to provide additional strength to the vehicle chassis. Each of the laminated sill plates 6 is positioned generally between a front and rear portion of the chassis at the periphery of each side respectively. Each of the laminated sill plates 6 can include one or more bends to accommodate different vehicle configurations and/or components and/or to re-direct a load path(s). Additionally, each of the laminated sill plates 6 can include additional support members 5 at a point of maximum stress (e.g., at a bend) to redirect a load path. The support members 5 can be tubular members coupled to the vehicle chassis using various methods such as welds, fasteners, or the like.

Each of the laminated sill plates 6 comprises two or more tubular members which are coupled (e.g., welded, bolted, etc) in parallel to provide increased stiffness when a bending or a shear load is encountered. As used herein, "coupled in parallel" means that the centerlines of the two elongated tubular members extend generally parallel to each other. When the laminated sill plates 6 encounter a shear/bending load, the multiple tubular members coupled together help to distribute the load across a larger surface area, resulting in increased stiffness and strength. In other exemplary embodiments, the laminated sill plates can include more than two tubular members per side to provide additional strength/load paths for the vehicle chassis. In other exemplary embodiments, the laminated sill plates 6 can be arranged in a generally upright orientation to provide a compression load path for the vehicle chassis (e.g., a generally vertical load path). In other exemplary embodiments, the laminated sill plates 6 may terminate at the front and/or rear of the vehicle chassis and branch into one or more tubular members which are arranged in different directions from the sill plates and provide alternative load paths (represented by a dashed line shown in FIG. 3).

According to an exemplary embodiment, the vehicle chassis includes a cantilevered portion 3 which operates as a "floating" center console. The cantilevered portion 3 is located in a middle portion of the vehicle chassis and extends from a front portion of the vehicle chassis. Although the cantilevered portion 3 has a generally horseshoe shape (as shown, for example in FIG. 2), other configurations are possible. The cantilevered portion 3 is configured to include various interior controls such as a gear shifter, an HVAC unit, a radio, a display, or similar interior control(s) (as shown, for example in FIG. 33). The cantilevered portion 3 is positioned above the floor of the vehicle chassis. The cantilevered portion 3 can be a single tubular member having a bend therein or can be comprised of multiple tubular members coupled together (e.g., using bolts, screws, welds, etc.). The cantilevered portion 3 is coupled to the vehicle chassis (e.g., using bolts, screws, welds, etc.).

According to an exemplary embodiment, the vehicle chassis can include various tubular members that can be modular or fixed within the vehicle chassis to provide support and/or mounting locations for other vehicle components. For example, according to an exemplary embodiment, the vehicle chassis can include one or more removable support members 7 configured to provide support when installed in the vehicle chassis, and also to provide an access point for the removal of various components (e.g., tanks, electrical systems, etc.) from the vehicle chassis when the support members are removed. According to other exemplary embodiments, the vehicle chassis can include one more tubular members 1 located at a front portion of the vehicle chassis and configured to provide rigidity to the vehicle chassis. According to other exemplary embodiments, the vehicle chassis can include one or more tank hangers 10 extending outward at the perimeter of the vehicle chassis. The tank hangers 10 are configured to be fixed members which include mounting points (e.g., bolt holes, brackets, etc.) for the installation of various coolant systems (e.g., intercoolers, radiators, oil coolers, and the like).

According to an exemplary embodiment shown in FIG. 4, the vehicle chassis includes a removable bracket 13 for the purpose of providing clearance for removal of a unitary engine and transaxle assembly (not shown). The removable bracket 13 comprises tubular members coupled to each other and arranged in a generally triangular configuration to provide structural rigidity to the vehicle chassis when the removable bracket is installed. Each of the tubular members of the removable bracket 13 can be coupled to each other using various methods, such as welding, bolts, brackets, etc. The removable bracket 13 can be removably coupled to the vehicle chassis using various fasteners such as bolts, screws, brackets, or the like. In other exemplary embodiments, the removable bracket 13 can be mounted in a generally horizontal plane to provide a generally planar floor in the vehicle chassis that can serve as a storage compartment (e.g., for luggage, tools, or the like). In other exemplary embodiments, the removable bracket 13 can serve as a mounting point for a suspension assembly component (e.g., a suspension A arm) (not shown) which may be mounted to a portion of the removable bracket to allow for increased stroke of a shock absorber and wheel. In other exemplary embodiments, the removable bracket 13 can include a tow hitch at an end of the bracket facing toward the rear of the vehicle chassis for towing the vehicle.

According to an exemplary embodiment shown in FIG. 5, the vehicle chassis includes a generally planar floor structure 14 having front and rear generally triangular shaped portions that direct loads/forces around the middle portion of the vehicle chassis (i.e., the occupant cell of the vehicle chassis) and the engine compartment (i.e., the rear portion of the vehicle chassis between reference numerals 15 and 17 in FIG. 5). Each of the generally triangular portions of the floor structure 14 include a plurality of tubular members arranged in a weaved configuration. As used herein, a "weaved configuration" means one or more of the tubular members are positioned diagonally to direct loads/forces, i.e. forces directed generally parallel to a front-rear axis of the vehicle chassis. Tubular members arranged in a weaved configuration are structured to direct loads/forces around a middle portion of the vehicle chassis (i.e., the occupant cell). The floor structure 14 also includes one or more tubular members positioned at a middle portion of the vehicle chassis and extending from the front to the rear of the chassis. The tubular members extending from the front to the rear of the vehicle chassis are arranged generally parallel to each other and are configured to provide support and structure to the vehicle chassis. The tubular members extending from the front to the rear of the vehicle chassis may include mounting points (e.g., bolt holes, brackets, studs, etc.) for the installation of interior components such as seats, pedal fixtures, floor panels, or other interior components.

According to an exemplary embodiment shown in FIG. 2, the vehicle chassis includes a plurality of main cross members 9, 9a arranged at various locations along a length of the generally planar floor structure 14. The main cross members 9, 9a run transversely between each side of the vehicle chassis and are configured to provide support and strength to the vehicle chassis. The main cross members 9, 9a are positioned in a generally planar configuration. The main cross members 9, 9a are tubular members coupled to the floor structure 14 using various methods such as welds, fasteners, or the like.

According to an exemplary embodiment shown in FIG. 5, the vehicle chassis includes a recess point 16 on each side of the vehicle chassis toward a front portion of the chassis to allow for front wheel clearance. The recess point is formed by two tubular members arranged in a generally crossed (i.e., X shaped) configuration to provide strength and side impact resistance. The tabular members forming the recess point 16 are arranged in a generally diagonal configuration relative to a length of the vehicle chassis. In other exemplary embodiments, the recess point 16 can be formed by more than two tubular members arranged in a similar configuration.

According to an exemplary embodiment shown in FIGS. 5A-5B, the vehicle chassis can include a parting line (e.g., a fault line, a separation line, etc.) that allows for the vehicle chassis to be separated into a front/middle portion and a rear portion, respectively. The parting line is configured to allow for the reconfiguration of the vehicle chassis such as including additional occupant space for the vehicle interior or changing the vehicle aesthetics (e.g., including different body panels). For example, according to an exemplary embodiment, the vehicle chassis can be separated into a front/middle portion and a rear portion along the parting line. Additional tubular members can then be installed (e.g., welded, fastened, etc.) between the front/middle portion and rear portions of the vehicle chassis, thereby extending the vehicle chassis length and providing a different aesthetic. The extended length of the vehicle chassis allows for various modifications of the vehicle such as including additional occupant seating, different interior components, different powertrain, and different body panels. Other vehicle components such as electrical wiring and cables routed between the front and rear portions of the vehicle can include connectors or other similar quick disconnects to allow for a simple separation of the two chassis portions.

According to an exemplary embodiment shown in FIG. 5B, the parting line allows for the integration of different body panels having a different aesthetic. The body panels can be separated at the parting line of the vehicle chassis and can be configured to pivot via one or more hinges or the like. The body panels can be configured to overlap with each other and/or abut with each other at the chassis parting line. The body panels can be configured to be removed/lifted manually or automatically (e.g., using electronic motors, hydraulics, or pneumatics). In other exemplary embodiments, the separated body panels can include one or more sensors configured to detect an obstruction when the body panels are being raised/removed from the vehicle chassis.

According to an exemplary embodiment, the parting line is positioned generally in a middle portion of the vehicle chassis behind a drivers seat position. The parting line passes through each tubular member of the vehicle chassis to allow for a complete separation of the front and rear portions of the vehicle chassis. The front and rear portions of the vehicle chassis can be removably coupled to each other using various fasteners such as bolts, screws, brackets, and the like. According to other exemplary embodiments, the front and rear portions of the vehicle chassis can be coupled to each other using a sleeved member configured to couple to each of the front and rear portions of the vehicle chassis respectively. According to other exemplary embodiments, additional tubular members can be removably coupled between the front and rear portions of the vehicle to extend the vehicle chassis (e.g., the wheelbase) and give the vehicle a different aesthetic. The additional tubular members can be coupled to the chassis using various fasteners or combinations of fasteners such as bolts, screws, brackets, or the like. According to other exemplary embodiments (not shown), there are multiple parting lines provided at different locations of the vehicle chassis to allow for further modifications of the vehicle.

According to an exemplary embodiment shown in FIGS. 3-3B and 5, the vehicle chassis includes hollow tubular members 15 each positioned at the front and rear of the vehicle chassis respectively, and running transversely between each side of the vehicle chassis (hereinafter "transverse members" 15). Each of the transverse members 15 are coupled to the floor structure 14 at the front and rear portions, respectively. In other exemplary embodiments, the transverse members 15 can be integrated with the floor structure 14 as a unitary structure. According to an exemplary embodiment, a portion(s) of the transverse members 15 can extend beyond the general perimeter of the vehicle chassis to provide additional mounting areas and internal housing areas for the installation of other vehicle components (e.g., body panels, mounting hardware, etc.). Referring to FIG. 3A, the transverse members 15 are configured to internally house an anti-roll bar assembly 100 to reduce body roll when the vehicle is turning/moving. The anti-roll bar assembly 100 can be installed at the front and/or the rear of the vehicle chassis.

Referring to FIG. 3B, according to an exemplary embodiment, the anti-roll bar assembly 100 includes a tubular member 110 that is configured to be installed within the transverse member 15 and protrude through an opening on each end of the transverse member 15. The anti-roll bar assembly 100 further includes a linkage assembly 120 positioned at each end of the tubular member 110 and removably coupled to an end of the tubular member 110. According to an exemplary embodiment, the linkage assembly 120 includes various components such as a pivot member 121, washers 122, bushings 123, a sleeve 124, and a nut 125. The pivot member 121 includes a first portion pivotably coupled to a second portion (e.g., using a ball joint or similar pivot interface). The first portion includes a threaded end configured to couple to the vehicle chassis (e.g., via a bracket assembly 130) using various fasteners or combinations of fasteners such as bolts, screws, nuts, brackets, and the like. The second portion includes a shaft with a threaded end configured to be inserted into an aperture of the tubular member 110. The shaft can be configured to have one or more washers 122 and/or bushings 123 installed thereon. The shaft can also include a sleeve 124 installed thereon. A nut 125 can be removably coupled to the threaded end of the second portion to couple the pivot member 121 to the tubular member 110.

According to an exemplary embodiment shown in FIGS. 3 and 5, the vehicle chassis includes a third wheel axle housing 17 positioned toward a middle portion of the vehicle chassis and running transversely between each side of the vehicle chassis. The third wheel axle housing 17 can be formed from one or more tubular members that are integrated with the floor structure 14. In other exemplary embodiments, the one or more tubular members can be coupled directly to the floor structure 14 or can be coupled to other support members 7 which form the vehicle chassis. As used herein, a "third wheel axle housing" 17 is configured for the installation of a wheel assembly (not shown) on each side of the vehicle chassis to allow the vehicle chassis to move (e.g., roll) and be supported by the wheel assemblies. In other exemplary embodiments, the vehicle chassis includes more than one axle housing 17 to allow for the installation of multiple wheel assemblies. In other exemplary embodiments, the third wheel axle housing 17 extends beyond the perimeter of the vehicle chassis to permit different wheel assembly configurations (e.g., different sized wheels).

According to an exemplary embodiment shown in FIGS. 1-4, the vehicle chassis includes front and rear roll bars 2 positioned generally in a middle portion of the vehicle chassis and extending across a width of the chassis at an upper portion thereof. The roll bars 2 have two generally upright portions at each end and a generally horizontal portion therebetween. The upright portions of the roll bars 2 extend down to the floor structure 14 of the vehicle chassis. The roll bars 2 can be coupled to tubular members 110 of the floor structure 14 using various methods or combinations of methods such as welding, fasteners, brackets, or the like. According to an exemplary embodiment, the front roll bar 2 is configured as a front windshield or windscreen that is generally planar. Each of the roll bars 2 are configured to provide rollover protection for the vehicle occupants and to provide strength and rigidity across the width of the vehicle chassis. According to other exemplary embodiments, each of the front and rear roll bars 2 can include one or more permanent front buttresses 4 extending down from the horizontal portions of each roll bar to the main chassis body (e.g., other tubular members of the vehicle chassis) in an angled formation (e.g., triangular) to prevent the roll bars from collapsing in the event of significant compression or vehicle rollover.

According to an exemplary embodiment shown in FIG. 6B, the vehicle chassis includes a triangular member 22 that can be coupled within the rear roll bar 2 and the buttresses 4 to provide additional rigidity. In other exemplary embodiments, the triangular member 22 can be removably coupled (using fasteners such as bolts, screws, brackets, etc.) to the rear roll bar 2 or fully integrated with the rear roll bar 2.

Each of the tubular members 1 of the vehicle chassis discussed herein can be coupled to each other using various methods such as welding, fasteners, brackets, or the like. Furthermore, each of the tubular members can have a different shaped cross-section or combinations of different shaped cross-sections such as for example, a circle, a square, a rectangle, etc. Additionally, each of the tubular members can be manufactured from various materials or combinations of materials having a maximum strength to minimum weight ratio such as aluminum, carbon fiber, composites, or similar materials.

Chassis System Bracket Configurations

Referring now to FIGS. 7-11, an integrated vehicle system includes various removable system brackets 13 which provide additional strength for safety and performance. According to an exemplary embodiment shown in FIGS. 7-9, a vehicle chassis includes a removable cross member 18 positioned between the front and rear roll bars 2. The cross member 18 is removably coupled to the front and/or rear roll bars 2 using fasteners such as bolts, brackets, pins, or the like.

According to other exemplary embodiments, the cross member 18 can be coupled to either, neither, or both of the front and rear buttresses 4 to provide a path for load/force transfer. As shown in FIG. 9, when the vehicle chassis experiences a torsional load (represented by block arrows) the cross member 18 provides a load path (represented by a dashed line) from the front buttress 4 through the front and rear roll bars 2 to the rear buttress 4.

According to an exemplary embodiment, the removable cross member 18 includes two tabular members, each having a bent portion. Each of the two tubular members are coupled together (e.g., using bolts, screws, brackets, welds, etc.) at their respective bent portions to form a cross member having a generally planar configuration. According to another exemplary embodiment shown in FIG. 8, one or more of the tubular members can have a curved portion to allow for helmet/head clearance of a driver/occupant. According to other exemplary embodiments, the cross member 18 can be a single unitary structure. According to other exemplary embodiments (not shown), the removable cross member 18 can be comprised of more than two tubular members.

According to an exemplary embodiment shown in FIGS. 10-11, the vehicle chassis includes a mandated FIA (Formula 1 safety body) cross brace 19 and/or a triangular element 20 to provide additional rollover protection and compression resistance. According to an exemplary embodiment, the cross brace 19 is coupled between the front and rear roll bars 2 in a similar manner to the cross member 18 in the embodiment shown in FIG. 7. The triangular element 20 is coupled to the rear buttresses 4 and the rear roll bar 2. In other exemplary embodiments, the cross brace 19 and the triangular element 20 are a single unitary structure. In other exemplary embodiments, the cross brace 19 and the triangular element 20 are comprised of multiple tubular members coupled together (e.g., using bolts, screws, welds, etc.).

According to an exemplary embodiment shown in FIGS. 10-11, the vehicle chassis includes a removable barn door compression and side impact member 21 pivotably coupled between the floor structure 14 and the upright portion of the front roll bar 2. The vehicle chassis can include one or more barn door compression and side impact members 21 positioned on each side of the vehicle chassis. The barn door compression and side impact member 21 is a generally T-shaped tubular member and is configured to pivot about a generally upright pivot axis (not shown) located between the floor structure 14 and the upright portion of the front roll bar 2. The barn door compression and side impact member 21 includes an upright portion that is configured to rotate and a generally horizontal portion that is configured to provide side impact and compression resistance. The generally horizontal portion is configured to pivot relative to the vehicle chassis to allow for the ingress and egress of an occupant of the vehicle. In an exemplary embodiment shown in FIG. 11, the generally horizontal portion of the barn door compression and side impact member provides compression resistance from a generally horizontal load applied from the front and/or rear of the vehicle chassis (represented by block arrows). In other exemplary embodiments, the barn door compression and side impact member 21 can be a single unitary structure or can be comprised of multiple tubular members coupled together (e.g., using bolts, screws, welds, etc.).

Suspension A Arm Dynamic Improvements

Referring now to FIGS. 12-15, an integrated vehicle system includes a vehicle chassis having an improved control arm (i.e., an "A" arm) for a fully independent suspension. A arms permit each wheel to be fully independent (i.e., fully independent to move up and down independently from any other wheel on the vehicle). Furthermore, A arms allow for a smoother ride and a more controlled, safer ride. From a smooth ride and control perspective, longer A arms are typically more advantageous because the resonant frequency of the A arm is slower and therefore there are less loads/forces transferred to the chassis during a given period of time. However, there are packaging constraints in modern vehicles that do not readily allow for the use of longer A arms. Furthermore, as shown in FIG. 13, the pivot points of typical A arms on vehicles are located in-line with the direction of vehicle travel and are generally parallel to each other.

According to an exemplary embodiment shown in FIGS. 12 and 14, a vehicle chassis includes multiple A arms having angled pivot points and longer arms. As shown in FIG. 12, upper and lower A arms are positioned at each of the four corners of a vehicle chassis. Each of the upper and lower A arms is mounted to the vehicle chassis at two angled pivot points. As shown in FIGS. 12 and 14, using angled pivot points allows for an increase in the length of the A arms without impeding on packaging constraints or changing the vehicle wheel position. Furthermore, as shown in FIG. 14, A arms having angled pivot points allow for easier triangulation of the chassis which results in a stronger, smaller, and lighter vehicle chassis.

According to an exemplary embodiment shown in FIG. 12, the angled A arm pivot points are arranged to direct linear forces (e.g., bump loads) into the vehicle chassis along specific load paths 24 (represented by dashed lines). The load paths 24 can be directed along specific tubular members of the vehicle chassis that are configured to absorb/dampen impact forces and simultaneously provide vehicle strength and stability.

According to an exemplary embodiment shown in FIG. 15, A arms having angled pivot points are configured to allow for easier mechanical turning of the wheels. For example, referring to FIG. 15, a top view of a wheel having an A arm mounted at a pivot point 28 is shown at three different wheel positions. Wheel position 26 is a static wheel position (i.e., when the vehicle is not moving). When the vehicle is moving and the wheels are turned, weight is transferred to the outside wheel causing the outside wheel to move from wheel position 26 to wheel position 25 (which ultimately causes the wheel base to increase slightly). In contrast, the inside wheel moves from wheel position 26 to wheel position 27 during the turn (which ultimately causes the wheel base to reduce slightly). This phenomenon is also depicted in FIG. 14A showing the effect of a left turn (indicated by a block arrow) on a vehicle suspension employing A arms having angled pivot points. As shown in FIG. 14A, the front and rear wheels at the top of the Figure (i.e., the wheels located on the outside of the turn radius) will move toward the outside of the vehicle from a first position (represented by solid wheel lines) to a second position (represented by dashed wheel lines) wherein the wheel base increases slightly due to the turning of the vehicle. The wheels located in the bottom portion of the Figure (i.e., the wheels located on the inside of the turn radius) will move toward the inside of the vehicle, which is similarly represented by solid and dashed wheel lines.

Although the wheelbase difference is very small (a large change would be undesirable), it is enough to aid the vehicle in turning and to provide feedback to the driver that the vehicle will move in the direction that it is steered. For similar reasons, during acceleration in a rear wheel drive vehicle, the rear of the vehicle will exhibit a slightly wider, more stable track because of a down force loading the A arms in the rear of the vehicle causing the rear wheels to move from wheel position 26 to wheel position 25. Likewise, during braking, the front of the vehicle will exhibit a slightly wider and more stable track because a down force will cause the front wheels to move from wheel position 26 to wheel position 25.

Underfloor Air Management Integration

Referring now to FIGS. 16-18, a vehicle chassis includes various customizable underfloor air management components. According to an exemplary embodiment shown in FIG. 1, the vehicle chassis includes a tubular member 8 that is arranged at an angular position relative to a horizontal plane to allow for a progressively greater volume of air to enter underneath the vehicle chassis from the rear. The angle of the tubular members relative to the horizontal plane can be in the range of about 3 degrees to about 25 degrees.

According to an exemplary embodiment shown in FIGS. 16-17, the vehicle chassis includes folded side sections 30 configured to direct high pressure air into low volume chambers 31 positioned behind the folded side sections 30. Each of the folded side sections 30 is positioned on each side of the vehicle in between the front and rear wheels respectively. The low volume chambers 31 are positioned directly in front of at least one radiator. In other exemplary embodiments, the low volume chambers 31 can be positioned in front of and/or be in fluidic communication with an intercooler, an oil cooler, or the like. The low volume chambers 31 can be triangular in shape to capture air flowing from the front to the rear of the vehicle. As air is passed between the front and rear wheels, it attempts to escape by flowing out of the sides of the vehicle. The low volume chambers 31 capture a portion of the air that escapes out of the sides of the vehicle.

According to an exemplary embodiment shown in FIG. 18, the core vehicle chassis includes a generally planar floor having a lip 33 positioned behind the rear wheels below the chassis floor structure 14. When the vehicle is moving, the lip 33 is configured to contain the air that flows underneath the vehicle chassis floor by creating an air dam. The generally planar floor can extend across the width of the vehicle chassis and the lip 33 can be located on a peripheral edge of both sides of the generally planar floor. The lip 33 can have different heights such as about 12 mm (112 inch). In other exemplary embodiments, the generally planar floor can include multiple lips (not shown) at various positions along the width of the floor.

Perimeter Compression System Functions

Referring now to FIGS. 16-20, the integrated vehicle system includes four perimeter compression systems located at the front of the vehicle, the rear of the vehicle, and at each side of the vehicle. Each of the compression systems is configured to absorb impact in the event of a vehicle crash and to protect critical/costly vehicle components (e.g., engine, transmission, etc.), and to protect the vehicle occupants. Furthermore, each of the compression systems is configured to be removable and replaceable with other compression systems (not shown) which can have different forms or functions. Each of the perimeter compression systems and their respective components can be constructed from various materials or combinations of materials such as folded sheet metal, aluminum, thermoplastics, fiberglass, or carbon fiber.

According to an exemplary embodiment shown in FIGS. 16-17 and 19, a front compression system is shown coupled to a front portion of a vehicle chassis. The front compression system comprises a front wing 35 located along a top portion of the front compression system. The angle of the front wing 35 can be adjusted to various angles such as between about 3 degrees to about 20 degrees from horizontal. The front wing 35 can also be positioned on the front compression system at various heights relative to the ground, such as between about 10 inches to about 24 inches from the ground.

In other exemplary embodiments, the front wing 35 can include a front bumper edge 36 which extends along a front portion of a peripheral edge of the front wing. The front bumper edge 36 can operate as a vehicle bumper in the event of a vehicle crash. In other exemplary embodiments, the front wing 35 can include one or more front wing fold-ups 34 positioned at each end of the front wing to direct air over the front tire(s). In other exemplary embodiments, the front wing 35 can further include one or more front wing side plates 38 positioned at each end of the front wing and extending downward below the front wing to provide overall structure to the front compression system. The front wing side plates 38 can be configured to have additional components installed thereon (e.g., other down force wings, structural members, etc.). In other exemplary embodiments (not shown), the front wing 35 can include a tow ring protruding from a front edge to allow for vehicle towing. Each of the front bumper edge 36, the front fold-up 34, and the front wing side plates 38 can be coupled to the front wing 35 using various fasteners or combinations of fasteners (such as bolts, screws, snaps, brackets, glue, etc.) or can be integrally formed with the front wing 35.

According to an exemplary embodiment, the front compression system also includes a front crush box 40 located generally in the center of the front compression system below the front wing 35. The front crush box 40 has a generally tapered shape and a hollow construction to allow for the absorption of impact/load in the event of a vehicle crush. The front crush box 40 is shown in FIG. 19 as having a generally rectangular shape, but can be configured to have any number of shapes or combinations of shapes such as circular, trapezoidal, square, etc. Additionally, the front crush box 40 can be a single or a multi-piece design. In other exemplary embodiments, the front crush box 40 can include a license plate mounting surface with mounting holes placed therein. The front crush box 40 can be coupled to the front wing 35 using various fasteners or combinations of fasteners (such as bolts, screws, snaps, brackets, glue, etc.) or can be integrally formed with the front wing 35.

According to an exemplary embodiment, the front compression system also includes two or more down force wings 39 each positioned on either side of the crush box 40 below the front wing 35. The down force wings 39 are generally planar and are positioned relative to the front wing 35 such that a front air pass through 37 is provided within the front compression system at each end to allow air to pass through (represented by a block arrow in FIG. 19) to the front brakes of the vehicle (see FIG. 17). The down force wings 39 can be configured to be independently adjustable or non-adjustable (e.g., angular adjustment) to adjust down force and equalize air pressure. In other exemplary embodiments, the down force wings 39 are configured to be linking elements to connect the front wing side plates 38 to the front crush box 40. The down force wings 39 can be coupled to the front crush box 40 and the front wing side plates 38 using various fasteners or combinations of fasteners (such as bolts, screws, snaps, brackets, glue, etc.) or can be integrally formed with either or both of the front crush box 40 and front wing side panels 38.

Referring to FIGS. 16-17 and 20, a rear compression system is shown coupled to a rear portion of a vehicle chassis. The rear compression system comprises a lower wing 42 located along a top portion of the rear compression system. The angle of the lower wing 42 can be adjusted to various angles such as between about 3 degrees to about 20 degrees from horizontal. The lower wing 35 can also be positioned on the rear compression system at various heights relative to the ground, such as between about 10 inches to about 24 inches from the ground.

In other exemplary embodiments, the lower wing 42 can include a delta upper wing mount 41 extending in a generally upright direction and positioned generally in the middle of a top surface of the lower wing 42. In other exemplary embodiments, the lower wing 42 includes a rear bumper edge 43 which extends along a portion of a peripheral edge of the lower wing. The rear bumper edge 43 can operate as a vehicle bumper in the event of a vehicle crash. In other exemplary embodiments, the lower wing 42 can further include one or more lower wing side plates 44 positioned at each end of the lower wing and extending downward below the lower wing to provide overall structure to the rear compression system. The lower wing side plates 44 can be configured to have additional components fastened therein (e.g., other down force wings, structural members, etc.). In other exemplary embodiments, the lower wing 42 includes a tow ring 46 protruding from a peripheral edge of the lower wing to allow for vehicle towing. In other exemplary embodiments, the tow ring 46 can be located below a peripheral edge of the lower wing 42. Each of the rear bumper edge 43, the lower wing side plates 44, and the tow ring 46 can be coupled to the lower wing 42 using various fasteners or combinations of fasteners (such as bolts, screws, snaps, brackets, glue, etc.) or can be integrally formed with the lower wing 42.

According to an exemplary embodiment, the rear compression system also includes a rear crush box 47 located generally in the center of the rear compression system below the lower wing 42. The rear crush box 47 has a generally tapered shape and a hollow construction to allow for the absorption of impact/load in the event of a vehicle crash. The rear crush box 47 is shown in FIG. 20 as having a generally trapezoidal shape, but can be configured to have any number of shapes or combinations of shapes such as circular, rectangular, square, etc. The rear crush box 47 is shown as having a multi-piece design in FIG. 20, but can be made of a single piece. The rear crush box 47 can be coupled to the tower wing 42 using various fasteners or combinations of fasteners (such as bolts, screws, snaps, brackets, glue, etc.) or can be integrally formed with the lower wing 42.

According to an exemplary embodiment, the rear compression system also includes two or more rear down force wings 48 each positioned on either side of the rear crush box 47 below the lower wing 42. The rear down force wings 48 are generally planar and are positioned relative to the lower wing 42 such that a rear air pass through 45 is provided through the rear compression system at each end to allow air to pass through to other areas of the vehicle. The rear down force wings 48 can be configured to be independently adjustable or non-adjustable (e.g., angular adjustment) to adjust the amount of down force and equalize air pressure. In other exemplary embodiments, the rear down force wings 48 are configured to be linking elements to connect the lower wing side plates 44 to the rear crush box 47. According to another exemplary embodiment, one or both of the rear down force wings 48 can be replaced with one or more muffler boxes which can be connected to an exhaust crosstube 49 routed to the engine of the vehicle (not shown). The rear down force wings and/or muffler boxes 48 can be coupled to the rear crush box 47 and the lower wing side plates 44 using various fasteners or combinations of fasteners (such as bolts, screws, snaps, brackets, glue, etc.)

According to other exemplary embodiments (not shown), in addition to the four perimeter compression systems, each wheel and A arm assembly can be configured to collapse and absorb impact in the event of a vehicle collision resulting in a total of eight perimeter compression zones at even intervals surrounding the vehicle occupants at about every 45 degrees.

According to other exemplary embodiments, the front and/or rear compression systems can be configured to be positioned at a side portion of the vehicle chassis to provide additional side impact protection. The side compression system can similarly include a hollow interior opening to serve as a crush box similar to the crush boxes of the front and rear compression systems. The vehicle chassis can include both, neither, or either side compression systems, a front compression systems, or a rear compression system.

Ride Height Adjustment Configurations

Referring now to FIGS. 21-25, an integrated vehicle system includes adjustable suspension units for easy and safe adjustment of the vehicle suspension ride height. Typically, to change the suspension ride height of a vehicle, a user must purchase and install different coil springs having different lengths to achieve a desired ride height. This is not ideal because there is no fine adjustment once the springs are installed. Moreover, changing the springs on the suspension is slow, laborious, and expensive.

Although many coil over spring assemblies have some built-in height adjustment, the height adjustment range is small and the adjustment method modifies the spring rate, in turn affecting ride quality. For example, typical coil over and damper assemblies include a bottom plate located on a threaded collar. A spring rests on the bottom plate, and the bottom plate can be adjusted by rotating it along the length of the threaded collar. This lowers the suspension ride height by compressing the spring. Alternatively, the bottom plate can be rotated in an opposite direction to decompress the spring to increase the vehicle ride height. However, the ride height change is typically very small (e.g., 112 inch or less) and the compressing/decompressing of the spring will affect the spring rate which will effectively change the feel of the ride (e.g., too soft or too firm). Furthermore, these typical coil over assemblies require a special tool and a great deal of force to rotate the bottom plate to compress/decompress the spring.

According to an exemplary embodiment shown in FIG. 21, an adjustable suspension unit 51 is shown installed on a vehicle 50 and a wheel 52. According to an exemplary embodiment shown in FIG. 22, the adjustable suspension unit 51 includes a damper 58 having a coil spring 59 installed over the damper such that the damper is positioned through a center portion of the coil spring. The adjustable suspension unit 51 also includes an extension rod 53 installed in an adjustment mechanism 54 located at a top portion of the suspension unit. The adjustment mechanism 54 is coupled to a mounting collar 55 which surrounds the extension rod 53 and abuts a portion of the coil spring 59.

According to an exemplary embodiment, the extension rod 53 includes a threaded portion 56 which is threadably coupled to an interior portion of the adjustment mechanism 54. The threaded portion 56 of the extension rod 53 extends along a length of the adjustment mechanism 54. The height/length of the extension rod 53 can thereby be adjusted by rotating either the extension rod 53 or the adjustment mechanism 54 along a length of the threaded portion 56. As shown in FIGS. 21 and 22, the extension rod 53 includes a center eyelet 57 located at a top portion of the extension rod for mounting the suspension unit to the vehicle 50. Thus, when the height/length of extension rod 53 is increased (e.g., rotated relative to the adjustment mechanism 54), the height of the suspension is increased, and when the height/length of the extension rod 53 is decreased (e.g., rotated in an opposite direction relative to the adjustment mechanism 54), the height of the suspension is decreased.

In other exemplary embodiments, the extension rod 53 can be mounted to the vehicle 50 using different mounting components/methods (e.g., brackets, bolts, etc.). In an exemplary embodiment shown in FIG. 25, the center eyelet 57 can be located on a side of the mounting collar 55. This configuration is advantageous because it allows for a longer extension rod 53, which thereby allows for a greater range of suspension ride height adjustment (e.g., one foot or greater).

According to an exemplary embodiment shown in FIGS. 22 and 25, the adjustment mechanism 54 is coupled to a mounting collar 55 which surrounds the extension rod 53. The mounting collar 55 includes a bottom portion which abuts a top portion of the coil spring 59. According to other exemplary embodiments shown in FIGS. 23-25, the mounting collar 55 can include a threaded exterior portion which surrounds the extension rod 53 and is configured to engage an adjustment gear 60 to permit the adjustment of the mounting collar 55 and adjustment mechanism 54 relative to the extension rod 53. For example, as shown in FIGS. 23 and 25, the adjustment gear 60 can be a 90 degree gear which includes an adjustment portion configured as a nut, a crosshead, a hex head, or the like. As shown in FIGS. 23 and 25, the adjustment gear 60 is threadably engaged with the threaded portion of the mounting collar 55. Thus, when the adjustment gear 60 is manually adjusted (e.g., rotated), the adjustment mechanism 54 and the mounting collar 55 are thereby rotated relative to the extension rod 53 along a length of the threaded portion 56 to allow for a height/length adjustment of the extension rod 53. The increase in the height/length of extension rod 53 increases the height of the vehicle suspension ride height.

In other exemplary embodiments shown in FIG. 24, the adjustment gear 60 can be integrated inside the mounting collar 55 to conceal the threaded engagement surface between the gear and the threaded portion of the mounting collar. In other exemplary embodiments (not shown), the adjustment mechanism 54 and collar 55 can be driven using other gears or drive mechanisms, or combinations of gears and drive mechanisms such as two 45 degree gears, one or more electrical motor(s), etc. In other exemplary embodiments shown in FIG. 24, the mounting collar 55 and the adjustment mechanism 54 can have a sleeve configuration with internal threads on the adjustment mechanism 54 which are configured to engage the threaded portion 56 of the extension rod 53. In other exemplary embodiments (not shown), the adjustment gear 60 can be electrically driven via electrical motors configured to drive the adjustment gear, and thereby adjust the suspension ride height. The electrical motors and corresponding electrical wiring can be housed within the suspension system, on the vehicle chassis, or within the vehicle cabin area.

The adjustable suspension unit disclosed herein allows for a greater adjustment range of vehicle suspension ride height and does not require the laborious removal of the suspension system or special tools to make adjustments. Furthermore, adjustment is fast and can be achieved manually or automatically with a remote or onboard power. Additionally, suspension adjustment can occur while the vehicle is on the ground without having to raise the vehicle on lift or jacks.

Tanks, Fluid, and Electrical Systemization

Referring now to FIGS. 26-27, the integrated vehicle system includes a modular tank and electrical system 158. Typically, in most vehicles, fluid containers/tanks and electrical components are positioned at various locations throughout the vehicle due to packaging constraints. This makes it difficult for an end user to re-configure the vehicle systems during the post-sale period because of the various locations of the vehicle components. Additionally, in most vehicles, the fuel tank (which is typically heavy—e.g., 150 lbs.) is located away from the center of mass of the vehicle (e.g., toward the front or rear of the vehicle). This may undesirably have a negative impact on the handling dynamics of the vehicle due to the weight increase away from the center of mass of the vehicle.

According to an exemplary embodiment shown in FIGS. 26-27, a modular tank and electrical system 158 is mounted in a middle portion of a vehicle chassis e.g., near the center of mass of the vehicle chassis). The modular tank and electrical system 158 includes various tanks and electrical system packaging areas arranged in a single, unitary structure. The modular tank and electrical system 158 comprises multiple tanks, packaging trays, and the like, coupled together to form a unitary structure. The modular tank and electrical system 158 has a generally elongated shape and a generally triangular cross-section configured to be installed into a vehicle chassis from a side of the vehicle. According to other exemplary embodiments (not shown), the modular tank and electrical system 158 can be configured to install from other areas of the vehicle chassis. In other exemplary embodiments (not shown), the modular tank and electrical system 158 can have a different shaped cross-section that complies with the packaging constraints of a particular vehicle. The modular tank and electrical system 158 can be removably coupled to the vehicle chassis using various fasteners or combinations of fasteners such as bolts, screws, snaps, brackets, or the like.

According to an exemplary embodiment shown in FIG. 27, the modular tank and electrical system 158 includes a washer fluid tank 159, an electrical packaging area 160, and a fluid tank packaging area 61. According to an exemplary embodiment, the washer fluid tank 159 is positioned near an end of the modular tank and electrical system 158. The electrical packaging area 160 includes multiple trays for mounting various electrical components as well as areas configured for routing electrical wiring thereto. The electrical packaging area 160 is configured to have various electrical components mounted therein, such as batteries, electronic control units (ECU), anti-lock brake systems (ABS), electronic regulators, fuse boxes, and the like. Each of the various electrical components can be configured to be removable from the modular tank and electrical system 158 for service and/or replacement.

According to an exemplary embodiment shown in FIG. 27, the fluid tank packaging area 61 can include various fluid tanks and overflow tanks such as a fuel tank, air pressure tanks, oil tanks, water tanks, and the like. According to other exemplary embodiments, each of the respective tanks can be removable from the packaging area 61 for service and/or replacement. Additionally, it is appreciated that the various tanks and electrical packaging areas can be located at different positions of the modular tank and electrical system 158, and can include other vehicle components mounted therein.

The modular tank and electrical system 158 is advantageous because of its modular design which allows for it to be removed by an end user and can be re-configured accordingly. Furthermore, the unique, compact design of the system allows for the system to be installed near the center of mass of the vehicle to improve overall vehicle handling.

Cabin System

Referring non/ho FIGS. 28-32, an integrated vehicle system includes interior tubs which are configured to mount directly to a vehicle chassis with no bodywork required. The interior tubs provide an open interior floor plan and are configured to allow for the installation of a different style front windshield (e.g., flat or curved glass) without the need for additional bodywork or modifications. In conventional vehicles, the interior has a mostly fixed specification in that the type of windshield that can be installed is limited to a single size/style. This is undesirable for an end user/customer because the exterior appearance is essentially fixed and cannot be changed without extensive modifications and/or costs.

According to an exemplary embodiment shown in FIGS. 29-30, a rear interior tub 62 is installed adjacent to the front interior tub 63 within an interior portion of the vehicle chassis. The rear interior tub 62 includes a tub portion and a flanged rim that extends along a peripheral edge of the rear interior tub. The flanged rim can include a gasket (not shown) positioned on an interior portion of the flanged rim to form a sealing surface for installation on the vehicle chassis. The rear interior tub 62 is configured to be installed from above the vehicle chassis such that an interior portion of the rim engages one or more tubular members of the vehicle chassis when installed. For example, as shown in FIG. 30, the tub portion of the rear interior tub 62 is positioned within a middle portion of the vehicle chassis such that an interior portion of the flanged rim engages the rear roll bar 2 and each of the laminated sill plates 6. The tub portion of the rear interior tub 62 includes a generally planar floor and a generally planar back portion.

According to an exemplary embodiment shown in FIG. 31, the flanged rim of the front interior tub 63 includes a peripheral edge that is configured to allow for the installation of multiple styles of windshields/windscreens. For example, referring to the top of FIG. 31, a portion of the flanged rim of the front interior tub 63 includes a recess extending along a peripheral edge of a portion of the rim which forms an opening for a windshield. The recess is configured to engage a flat windshield 65 mounted therein. Referring to the bottom of FIG. 31, according to an exemplary embodiment, the flanged rim of the front interior tub 63 also includes a curved portion (i.e., a curved apron) that is configured to engage a curved windshield 67. The curved portion of the flanged rim creates a seal with the curved windshield 67 when it is installed.

According to an exemplary embodiment shown in FIG. 28, the front and rear interior tubs 63, 62 can include one or more runners installed at each side of the vehicle chassis. Each of the runners is configured to engage a tubular frame member located on a side of the vehicle chassis, and to provide a sealing surface for the side glass panels when installed. Each of the side glass panels can include one or more curved surfaces which are complementary to a portion of the runner installed at each side of the vehicle. Thus, when each of the side glass panels are mounted to a side of the vehicle, a portion of a curved surface of each of the side glass panels will seal against a portion of a runner. The runners can be separate components or can be integrally formed with either of the front or rear interior tubs 63, 62.

According to an exemplary embodiment shown in FIG. 32, the rear interior tub 62 which includes a tub portion having a generally planar floor is configured for routing various cables and vehicle components while maintaining an open floor design. For example, referring to FIG. 32, the vehicle chassis can include a cantilevered center console extending from a middle portion of the vehicle chassis above the generally planar floor of the rear interior tub 62. The cantilevered center console can include a gear shifter amongst other vehicle components. To maintain an open floor design, the gear shifter can communicate with the vehicle transmission (not shown) located in a rear portion of the vehicle via a shift cable 68. The shift cable 68 is routed (e.g., looped) behind the center console and into the tub portion of the front interior tub 63 and routed back underneath the generally planar floor of the rear interior tub 62 to the transmission/transaxle. This configuration helps maintain an open floor plan because the cantilevered center console and the shift cable do not impede on the interior occupant space.

According to other exemplary embodiments, the front interior tub 63 and the rear interior tub 62 can be configured to engage one or more tubular members of the vehicle chassis when installed. According to other exemplary embodiments, each of the front and rear interior tubs 63, 62 can be configured to include additional components mounted therein such as an air conditioning unit, electrical components, or other interior vehicle components. Each of the front and rear interior tubs 63, 62 can be manufactured from various materials or combinations of materials such as plastics, carbon fiber, aluminum, composites, metals, or the like.

Gear Shift System

Referring to FIG. 33, an integrated vehicle system includes a gear shifter that is configured to shift the gears of a manual transmission via electronic components without the need for mechanical cables and/or mechanical interfacing between the gear shifter and the transmission. According to an exemplary embodiment, the gear shift assembly includes one or more electronic solenoids coupled to the shift arms of a gearbox via an intermediate spring (e.g., a mechanical spring, a pneumatic spring, etc.). The solenoid (s) is in electronic communication with the shifter via electrical wiring (not shown) or remote wireless technology, and is configured to activate/respond based on an appropriate change in gears (i.e., a gear shift). The solenoid is in mechanical communication with the shift arms of a gear box via one or more springs. The one or more springs are coupled to the solenoid at one end of the spring and are coupled to the shift arm of the transmission at the other end of the spring. The one or more springs can be made out of various materials or combinations of materials such as steel, aluminum, or the like.

In an exemplary gear change, the gear shifter is moved/shifted from one gear to another by the driver of the vehicle. This gear shift is communicated via electronic correspondence to the solenoid which is activated in response to the communicated gear change. As a result of the solenoid activation, the spring is compressed briefly (e.g., 1-2 seconds) before displacing the shift arm of the transmission. This brief compression period allows for the gears of the transmission to align property before shifting gears. If the gears of the transmission are misaligned, the spring will absorb the displacement of the solenoid (e.g., it will compress a distance equal to the distance of solenoid travel) and the shift arm of the gear box will not be displaced. Ultimately, this allows for a smoother shift between gears and helps avoid a situation where the transmission gears grind against the solenoid due to gear misalignment.

According to an exemplary embodiment, the gear shift assembly includes one or more servo motors configured to communicate with the shift arms of a transmission gearbox. According to an exemplary embodiment, a first servo motor is coupled to a shifter of a vehicle and a second servo motor is coupled to a shift arm of a gear box. Each of the first and second servo motors is in electronic communication with the other via electrical wiring or remote wireless technology. The first and second servo motors are also electronically connected via a force feedback loop. The force feedback loop permits the communication of forces between the first and second servo motors. For example, if the first servo motor rotates a certain amount then the second servo motor will rotate the same amount and vice versa. The motor rotation experienced by the second servo motor is due to the feedback received via the force feedback loop.

In an exemplary gear change, the gear shifter is moved/shifted from one gear to another by the driver of the vehicle. This gear shift is communicated via electronic correspondence (e.g., force feedback) from the first servo motor to the second servo motor which is activated in response to the communicated gear change. As a result of the communication from the first servo motor, the second servo motor translates (e.g., rotates, moves, etc.) and thereby displaces the shift arm of the transmission. If the gears of the transmission are misaligned and the second servo motor is unable to displace the shift arm of the transmission to shift gears, the second servo motor will communicate this to the first servo motor via the force feedback loop and the driver will be unable to shift gears (i.e., the second servo motor will prevent the first servo motor from rotating/moving).

Body Panel Configurations

Referring now to FIGS. 34-39, an integrated vehicle system includes modular body panels removably coupled to a vehicle chassis using a plurality of body rod assemblies. According to an exemplary embodiment shown in FIG. 34, a vehicle chassis having a tubular member 75 includes one or more modular body rod assemblies coupled thereto. The tubular member 75 includes at least one through-hole placed therein to allow for the installation of at least one body rod assembly. When a body rod assembly is removed from the unused through-hole, upper and lower plugs 73, 77 can be placed therein to seal off the through-hole to prevent dirt and grime to enter the tubular member 75.

According to an exemplary embodiment shown in FIG. 34, the body rod assembly includes an upper riv nut 74 press fit inside a top portion of the through-hole and a lower riv nut 76 press fit inside a bottom portion of the through-hole. The body rod assembly further includes a threaded rod 72 configured to thread within each of the upper and lower riv nuts 74, 76, respectively. The threaded rod 72 can be cut to pre-determined lengths or can have a common length. The threaded rod can also have different diameters (e.g., ⅛ inch, 114 inch, etc.). The body rod assembly further includes a washer 70 configured to provide support to an installed body panel 71. The washer 70 can be made from a variety of different materials or combinations of materials, but is preferably made from a malleable material such as rubber, plastics, composites, or the like. The threaded rod 72 includes a fastener 69 that is configured to sandwich the body panel 71 between the fastener and the washer 70. The fastener 69 can be a variety of different style fasteners such as a cotter key, a clip, a threaded nut, or similar fastener.

According to an exemplary embodiment shown in FIGS. 35-36, the body panel 71 can be a completely integrated body shell including fenders, a hood, quarter panels, side panels, rocker panels, a trunk, front fenders, or other exterior body components such as lights, indicators, trim, etc. The body panel 71 is configured to install from above the vehicle chassis. In other exemplary embodiments, the body panel 71 is comprised of multiple individual body panels that can be configured to be separately coupled to the vehicle chassis from the sides, the front, or the rear of the vehicle.

According to an exemplary embodiment shown in FIGS. 37-39, the body panel 71 can include a rear roof portion having a large aperture (e.g., 50 inches by 45 inches) configured to permit air to flow between an underside of the vehicle and a top exterior portion of the vehicle. The large aperture can be configured to have various shapes (e.g., square, circular, oval, etc.). In other exemplary embodiments, the body panel 71 can include a removable cover to seal off the large aperture of the rear roof portion to maintain a laminar flow of air across a top portion of the body panel 71. In other exemplary embodiments, the body panel 71 can include a modular (i.e., removable) luggage tub (not shown) mounted below a portion of the rear roof. The large aperture and removable cover can operate as an access point to the luggage tub. The removable cover can be configured to lock to the body panel 71 to protect the contents of the luggage tub.

According to an exemplary installation, upper and lower riv nuts 74, 76 are installed (e.g., press fit, threaded, etc.) in the top and bottom portions of a through-hole on a tubular chassis member 75, respectively. In other exemplary embodiments, the upper and lower riv nuts 74, 76 are integrated into the tubular member 75 of the vehicle chassis (e.g., welded, bonded, etc.). The threaded rod 72 is threaded into each of the upper and lower riv nuts 74, 76, respectively, leaving an upper exposed portion of the threaded rod that is sufficient to engage a body panel 71 when the body panel is installed onto the vehicle chassis. A washer 70 is positioned on a top portion of the threaded rod 72. Next, a body panel 71 having at least one through-hole therein is lowered onto the vehicle chassis such that the threaded rod 72 protrudes through the through-hole of the body panel 71 and a top portion of the washer 70 engages a bottom portion of the body panel 71. Finally, the fastener 69 is removably coupled (e.g., threaded, fastened, clipped, etc.) to a top portion of the threaded rod 72 to secure the body panel 71 to the vehicle chassis.

During the post-sale period of the vehicle life, an end user/customer is free to remove the body panel 71 and replace it with a different body panel to give the vehicle different aesthetics. The end user can simply remove the fastener 69 from the threaded rod 72 and lift the body panel 71 from the vehicle chassis. This is advantageous because it allows an end user/customer to easily and quickly reconfigure their vehicle without expending too much time or money.

As utilized herein, the terms "approximately," "about," "substantially," and similar terms are intended to have abroad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

The construction and arrangement of the elements of the vehicle chassis, the adjustable suspension units, the underbody air management system, the perimeter compression systems, the modular tank and electrical system, the interior tubs, the gear shift systems, and the body panel system as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., support members, laminated sill plates, main cross members, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An adjustable automobile suspension unit, comprising: a damper housing with a damper rod extending therefrom, a coil spring positioned around the damper housing, a suspension unit mounting collar fixedly secured relative to the damper housing and extending in an opposing relationship relative to the damper rod, a rotatable adjustment mechanism secured in place relative to the damper housing by the mounting collar and rotatable relative to the mounting collar, with the rotatable adjustment mechanism having a threaded interior portion, and an adjustable extension rod with a threaded exterior portion that engages the threaded interior portion of the rotatable adjustment mechanism, and the adjustable extension rod is displaced along its longitudinal axis upon actuation of the rotatable adjustment mechanism.

2. The adjustable automobile suspension unit of claim 1, wherein the adjustable extension rod includes an eyelet thereon for mounting the suspension unit to a vehicle.

* * * * *

UNITED STATES PATENT AND TRADEMARK OFFICE
CERTIFICATE OF CORRECTION

PATENT NO. : 10,661,835 B2  
APPLICATION NO. : 14/601348  
DATED : May 26, 2020  
INVENTOR(S) : Tiramani Page 1 of 1

It is certified that error appears in the above-identified patent and that said Letters Patent is hereby corrected as shown below:

In the Specification

In Column 3, Line 54, delete "Angles A arms to enable amore" and insert -- Angled A arms to enable a more --, therefor.

In Column 3, Line 62, delete "Angles A" and insert -- Angled A --, therefor.

In Column 4, Line 53, delete "downward." and insert -- downward --, therefor.

In Column 10, Line 8, delete "etc)" and insert -- etc.) --, therefor.

In Column 12, Line 1, delete "tabular" and insert -- tubular --, therefor.

In Column 12, Line 45, delete "drivers" and insert -- driver's --, therefor.

In Column 14, Line 59, delete "tabular" and insert -- tubular --, therefor.

In Column 19, Line 29, delete "tower" and insert -- lower --, therefor.

In Column 22, Line 59, delete "non/ho" and insert -- now to --, therefor.

In Column 24, Line 46, delete "property" and insert -- properly --, therefor.

In Column 26, Line 42, delete "abroad" and insert -- a broad --, therefor.

Signed and Sealed this  
Seventh Day of July, 2020

Andrei Iancu  
*Director of the United States Patent and Trademark Office*